(12) United States Patent
Fisher

(10) Patent No.: US 11,356,355 B1
(45) Date of Patent: Jun. 7, 2022

(54) EXTENSION TO SOFTWARE DEFINED NETWORKING TO MANAGE STORAGE AREA NETWORKS

(71) Applicant: International Business Machines Corporation, Armonk, NY (US)

(72) Inventor: Gary Allen Fisher, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/215,473

(22) Filed: Mar. 29, 2021

(51) Int. Cl.
| | |
|---|---|
| G06F 15/16 | (2006.01) |
| H04L 45/02 | (2022.01) |
| H04L 67/1097 | (2022.01) |
| H04L 45/302 | (2022.01) |
| H04L 45/42 | (2022.01) |

(52) U.S. Cl.
CPC .......... *H04L 45/02* (2013.01); *H04L 45/3065* (2013.01); *H04L 45/42* (2013.01); *H04L 67/1097* (2013.01)

(58) Field of Classification Search
CPC ..... H04L 45/02; H04L 45/3065; H04L 45/42; H04L 67/1097
USPC .................................................. 709/238, 245
See application file for complete search history.

(56) References Cited

U.S. PATENT DOCUMENTS

| | | | |
|---|---|---|---|
| 9,641,249 B2 | 5/2017 | Kaneriya et al. | |
| 10,277,535 B2 | 4/2019 | Kamath et al. | |
| 10,567,241 B2 | 2/2020 | Wang et al. | |
| 2003/0154301 A1* | 8/2003 | McEachern | H04L 45/42 709/237 |
| 2008/0084991 A1* | 4/2008 | Chuang | H04M 1/27485 379/359 |
| 2014/0003228 A1* | 1/2014 | Shah | H04L 45/28 370/242 |
| 2016/0197831 A1* | 7/2016 | De Foy | H04L 45/566 370/392 |
| 2016/0285972 A1* | 9/2016 | Puttagunta | H04L 45/42 |
| 2018/0307522 A1* | 10/2018 | Wu | H04L 49/70 |
| 2020/0169509 A1* | 5/2020 | Tigli | H04L 41/145 |
| 2020/0213205 A1* | 7/2020 | Savoor | H04L 41/0681 |
| 2021/0385149 A1* | 12/2021 | Suryanarayana | H04L 43/0811 |

OTHER PUBLICATIONS

Bari, "A File System Abstraction for NFV Orchestration"; 2015 IEEE Conference on Network Function Virtualization and Software Defined Network (NFV-SDN), IEEE, 2015, 7pages.
DeCusatis; "Reference Architecture for Multi-Layer Software Defined Optical Data Center Networks", Electronics 4.3 (2015); 18 pages.

(Continued)

*Primary Examiner* — Liang Che A Wang
(74) *Attorney, Agent, or Firm* — Cantor Colburn LLP; Edward Wixted

(57) ABSTRACT

Embodiments of the invention are directed to utilizing an extension to software defined networking (SDN) to manage storage area networks (SANs) by receiving, at a switch configured with and managed by a SDN architecture, at least one table. The at least one table being operable in the SDN architecture and including routing information. The switch routes traffic over a SAN using the routing information in the at least one table.

20 Claims, 41 Drawing Sheets

(56) References Cited

OTHER PUBLICATIONS

Lu Yifel, "Design and Implementation of New SAN Architecture Based on Controller," Journal of Computer Research and Development 53.6 (2016); 14 pages.
Silva, "Software-Defined Networking with Services Oriented by Domain Names," Telecommunication Systems 74.1 (2020); 16pages.
Fisher; "An Investigation and Design of Software Defined Networking Applied to Storage Area Network Connectivity"; ISeidenberg School of Computer Science and Information Systems Pace University; May 2020; 339 pages.

* cited by examiner

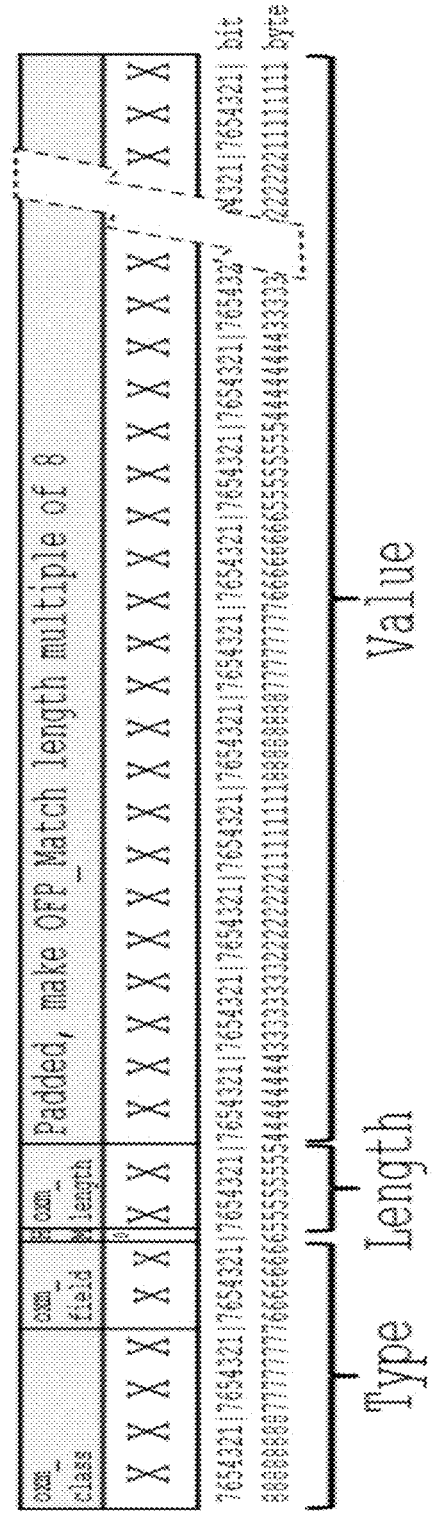

FIG. 8

| type | length | oxm_class | oxm_field | | IPv4 Dest Address | Pad 4 bytes |
|---|---|---|---|---|---|---|

Header       Extensible Match field       Pad

OFPXMC_OPENFLOW_BASIC = 0x8000, /* Basic class for OpenFlow */
OFPXMT_OFB_IPV4_DST = 0x0C, /* IPv4 destination address. */
              /* 192.168.1.1 = 0xC0A80101 */

FIG. 9

| type | length | oxm_class | oxm_field | | IPv4 Dest Address (length 4) | Bitmask (length 4) | Pad |
|---|---|---|---|---|---|---|---|

Header       Extensible Match field       Pad

OFPXMC_OPENFLOW_BASIC = 0x8000, /* Basic class for OpenFlow */
OFPXMT_OFB_IPV4_DST = 0x0C, /* IPv4 destination address. */
              /* 192.168.1.0/24=0xC0A80100 */

FIG. 10

OFPXMT_OFB_TCP_DST = 14, /* TCP destination port. */

| type | length | oxm_class | oxm_field | oxm_length | Dest TCP Port | Pad 7 bytes |
|---|---|---|---|---|---|---|
| 0 0 0 1 | 0 0 0 9 | 8 0 0 0 | 0 E | 0 1 | 8 0 | 0 0 0 0 0 0 0 |

Header | Extensible Match field | Pad

FIG. 11

/* IPv4 destination address. */

| type | length | oxm_Class | oxm_field | oxm_length | IPv4 Dest Address | |
|---|---|---|---|---|---|---|
| 0 0 0 1 | 0 0 1 1 | 8 0 0 0 | 0 C | 0 4 | C 0 A 8 0 1 0 1 | bit byte |

Header — Extensible Match field 1 — Continued

/* and TCP destination port. */

| oxm_Class | oxm_field | oxm_length | Dest TCP Port | Pad 7 bytes | |
|---|---|---|---|---|---|
| 8 0 0 0 | 0 E | 0 1 | 8 0 | 0 0 0 0 0 0 0 0 0 0 0 0 0 0 | bit byte |

Extensible Match field 2 — Pad

FIG. 12

OpenFlow 1.2 Extensible match field new SAN class & field combinations

| oxm class | oxm field | oxm length | Body (1-254 bytes long) padded to make OFP Match a multiple of 8 bytes long |
|---|---|---|---|
| 0FFXMC_EXPERIMENTER | 0FF93BLF SANxxx | X N: | |

```
OFPXMC_EXPERIMENTER=0xFFFF    /* Extensible Match Class        */
OFPXMCF_SANSWWN=0x71,         /* SAN Src WorldWideName  lng=8  */
OFPXMCF_SANDWWN=0x72,         /* SAN Dst WorldWideName  lng=8  */
OFPXMCF_SANSDID=0x73,         /* SAN Src Domain ID      lng=1  */
OFPXMCF_SANDDID=0x74,         /* SAN Dst Domain ID      lng=1  */
OFPXMCF_SANSPID=0x75,         /* SAN Src Port ID        lng=1  */
OFPXMCF_SANDPID=0x76,         /* SAN Dst Port ID        lng=1  */
OFPXMCF_SANSALA=0x77,         /* SAN Src Arb Loop ID    lng=1  */
OFPXMCF_SANDALA=0x78,         /* SAN Dst Arb Loop ID    lng=1  */
OFPXMCF_SANSNUM=0x79,         /* SAN Src Port Number    lng=2  */
OFPXMCF_SANDNUM=0x7A,         /* SAN Dst Port Number    lng=2  */
OFPXMCF_SANSXID=0x7B,         /* SAN Src Exchange ID    lng=4  */
OFPXMCF_SANDXID=0x7C,         /* SAN Dst Exchange ID    lng=4  */
OFPXMCF_SANSVID=0x7D,         /* SAN Src VSAN/FID ID    lng=2  */
OFPXMCF_SANDVID=0x7E,         /* SAN Dst VSAN/FID ID    lng=2  */
```

FIG. 13

OFPXMCF_SANxWWN=0x71&2  /* SAN WorldWideName, length=8 */

| type | length | oxm_class | oxm_field_length | WWN |
|---|---|---|---|---|
| 0010 | 0010 | FFFF | 0810 | 00 c4 f5 7c 1d 25 a0 |

FIG. 14

OFPXMCF_SANxDID=0x73&4,  /* SAN Domain ID, length=1 */

| type | length | oxm_class | oxm_field_length | DID | Pad 7 bytes |
|---|---|---|---|---|---|
| 0010 | 0009 | FFFF | 0730 | 01 | 00 00 00 00 00 00 00 |

FIG. 15

OFPXMCF_SANxPID=0x75&6, /* SAN Port ID, length=1 */

| type | length | oxm_ class | oxm_ field | oxm_ length | PID | Pad 7 bytes |
|------|--------|-----------|------------|-------------|-----|-------------|
| 0001 | 0009 | FFFF | 75 | 01 | C0 | 00 00 00 00 00 00 00 |

FIG. 16

OFPXMCF_SANxALA=0x77&8, /* SAN Arb Loop Addr, length=1 */

| type | length | oxm_ class | oxm_ field | oxm_ length | ALA | Pad 7 bytes |
|------|--------|-----------|------------|-------------|-----|-------------|
| 0001 | 0009 | FFFF | 77 | 01 | 80 | 00 00 00 00 00 00 00 |

FIG. 17

OFPXMCF_SANxNUM=0x79&A, /* SAN Port Number, length=2 */

| type | length | oxm_class | oxm_field | oxm_length | NUM | Pad 6 bytes |
|---|---|---|---|---|---|---|
| 0 0 1 0 | 0 0 A | F F F F | 7 9 | 0 2 | 0 0 0 2 | 0 0 0 0 0 0 0 0 |

FIG. 18

OFPXMCF_SANxXID=0x7B&C, /* SAN Exchange ID, length=2 */

| type | length | oxm_class | oxm_field | oxm_length | XID | Pad 6 bytes |
|---|---|---|---|---|---|---|
| 0 0 1 0 | 0 0 A | F F F F | 7 B | 0 2 | 2 8 b 4 f | 0 0 0 0 0 0 0 0 |

FIG. 19A

OFPXMCF_SANxVID=0x7D&E; /* SAN VSAN/FID ID, length=2 */

| type | length | oxm_Class | oxm_field | HM | oxm_length | TO FIG. 19B |
|------|--------|-----------|-----------|----|-----------|-------------|
| 0    | 0   0   1 | 0   0   0   A | F   F   F   F | 7   D | 0 | 2 |

OFPXMCF_SANxDIDxSANxPID, /* SAN Domain & PortID combined */

| type | length | oxm_class | oxm_field | oxm_length | DID | oxm_class | oxm_field | oxm_length | PID | Pad 2 bytes |
|---|---|---|---|---|---|---|---|---|---|---|
| 0 0 1 0 | 0 0 E | F F F F | 7 3 | 0 1 0 1 | F F F F | 7 5 | 0 1 C | 0 0 | 0 0 | |

FIG. 21

OFPXMCF_SANxPIDxSANxALA, /* SAN PortID & ALA combined */

| type | length | oxm_class | oxm_field | oxm_length | PID | oxm_class | oxm_field | oxm_length | ALA | Pad 2 bytes |
|---|---|---|---|---|---|---|---|---|---|---|
| 0 0 1 0 | 0 0 E | F F F F | 7 3 | 0 1 0 1 | F F F F | 7 7 | 0 1 C | 0 0 | 0 0 | |

FIG. 22

OFPXMCF_SAN_xDID&SANxPID&SANxALA, /* Domain, PortID & ALA */

| type | length | oxm_class | oxm_field | Hoxm_length | DID | oxm_class | oxm_field | Hoxm_length | PID | oxm_class |
|------|--------|-----------|-----------|-------------|-----|-----------|-----------|-------------|-----|-----------|
| 0 0 0 1 | 0 0 1 3 | F F F F | 7 3 | 0 1 | 0 1 | F F F F | 7 5 | 0 1 | C 0 | F F F F |

Continued

| oxm_field | Hoxm_length | ALA | Pad 5 bytes | | | | |
|-----------|-------------|-----|-------------|---|---|---|---|
| 7 7 | 0 1 | 8 0 | 0 0 0 0 0 0 0 0 0 0 |

Commands to send SAN traffic for a Domain ID / Port Address to a port ovs-ofctl --protocols=OpenFlow12,OpenFlow13
--flow-format=OXM-OpenFlow12
add-flow tcp:10.10.10.111 fcp
did_dst=01,pid_dst=04,
actions=output:fc4

FIG. 28

Commands to send SAN traffic for a WWN to a port ovs-ofctl --protocols=OpenFlow12,OpenFlow13
--flow-format=OXM-OpenFlow12
add-flow tcp:10.10.10.111 fcp
wwn_dst=50:05:e4:f5:7c:01:12:eb,
actions=output:fc4

FIG. 30

Commands to implement a SAN zone using WWNs ovs-ofctl --protocols=OpenFlow12,OpenFlow13
--flow-format=OXM-OpenFlow12
add-flow tcp:10.10.10.111 fcp priority=201
wwn_src=c0:50:a5:13:2d:08:1c:c1,
wwn_dst=50:05:c4:f5:7c:01:12:eb,
actions=output:fc4 ovs-ofctl --protocols=OpenFlow12,OpenFlow13
--flow-format=OXM-OpenFlow12
add-flow tcp:10.10.10.111 fcp priority=202
wwn_src=50:05:c4:f5:7c:01:12:eb,
wwn_dst=c0:50:a5:13:2d:08:1c:c1,
actions=output:fc1 ovs-ofctl --protocols=OpenFlow12,OpenFlow13
--flow-format=OXM-OpenFlow12
add-flow tcp:10.10.10.111 fcp priority=101
wwn_dst=c0:50:a5:13:2d:08:1c:c1,
actions=drop ovs-ofctl --protocols=OpenFlow12,OpenFlow13
--flow-format=OXM-OpenFlow12
add-flow tcp:10.10.10.111 fcp priority=102
wwn_dst=50:05:c4:f5:7c:01:12:eb,
actions=drop

FIG. 32

Commands to implement a SAN zone using Domain ID and Port Address ovs-ofctl --protocols=OpenFlow12,OpenFlow13
  --flow-format=OXM-OpenFlow12
  add-flow tcp:10.10.10.111 fcp priority=201
    did_src=01,pid_src=01,
    did_dst=01,pid_dst=04,
    actions=output:fc4 ovs-ofctl --protocols=OpenFlow12,OpenFlow13
  --flow-format=OXM-OpenFlow12
  add-flow tcp:10.10.10.111 fcp priority=202
    did_src=01,pid_src=04,
    did_dst=01,pid_dst=01,
    actions=output:fc1 ovs-ofctl --protocols=OpenFlow12,OpenFlow13
  --flow-format=OXM-OpenFlow12
  add-flow tcp:10.10.10.111 fcp priority=101
    did_dst=01,pid_dst=01,
    actions=drop ovs-ofctl --protocols=OpenFlow12,OpenFlow13
  --flow-format=OXM-OpenFlow12
  add-flow tcp:10.10.10.111 fcp priority=102
    did_dst=01,pid_dst=04,
    actions=drop

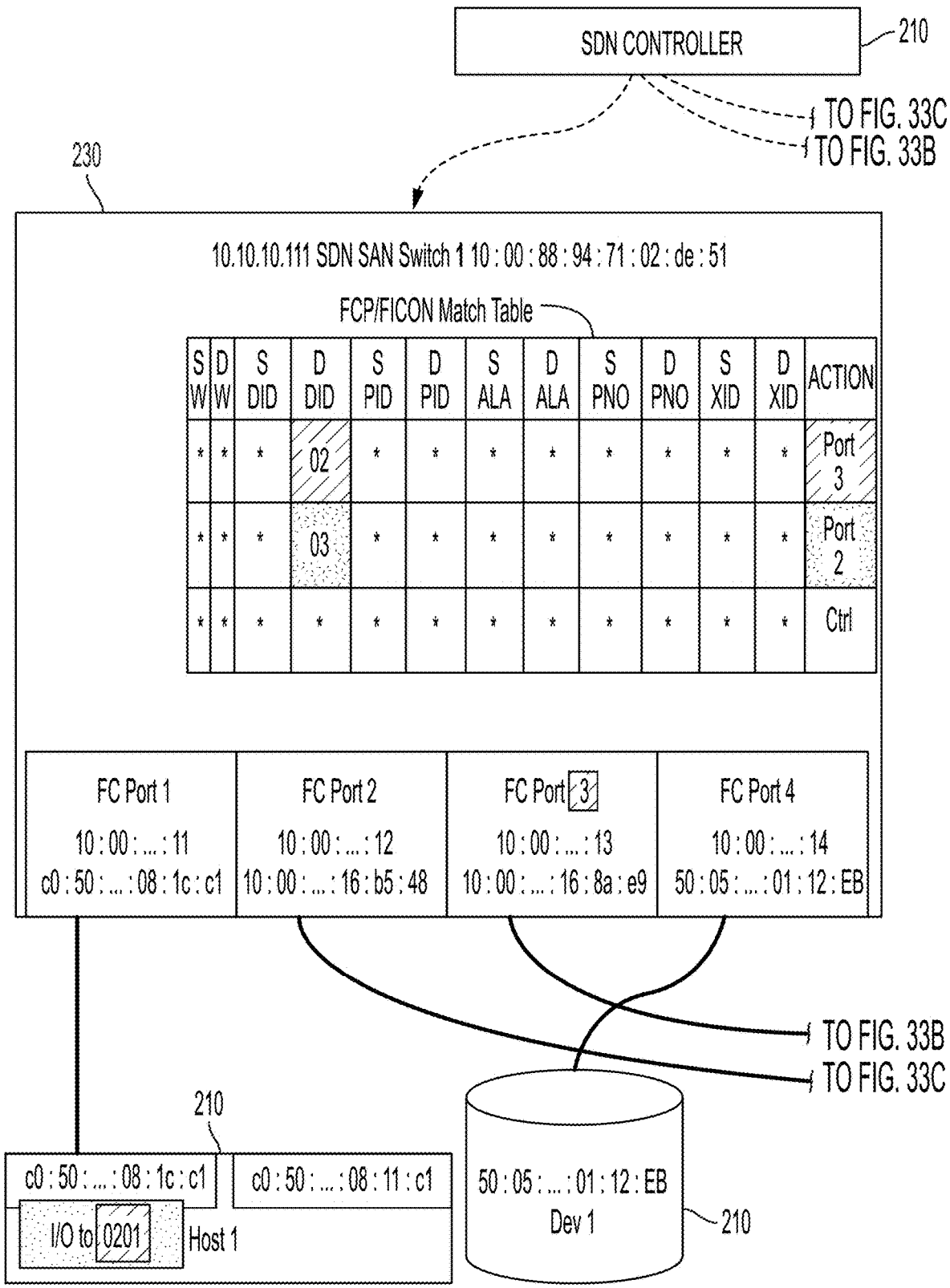

FIG. 34

Commands to implement InterSwitch Link (ISL) routing ovs-ofctl --protocols=OpenFlow12,OpenFlow13
    --flow-format=OXM-OpenFlow12
    add-flow tcp:10.10.10.111 fcp
    did_dst=02,
    actions=output:fc3 ovs-ofctl --protocols=OpenFlow12,OpenFlow13
    --flow-format=OXM-OpenFlow12
    add-flow tcp:10.10.10.111 fcp
    did_dst=03,
    actions=output:fc2 ovs-ofctl --protocols=OpenFlow12,OpenFlow13
    --flow-format=OXM-OpenFlow12
    add-flow tcp:10.10.10.122 fcp
    did_dst=01,
    actions=output:fc2 ovs-ofctl --protocols=OpenFlow12,OpenFlow13
    --flow-format=OXM-OpenFlow12
    add-flow tcp:10.10.10.133 fcp
    did_dst=01,
    actions=output:fc2

FIG. 35C
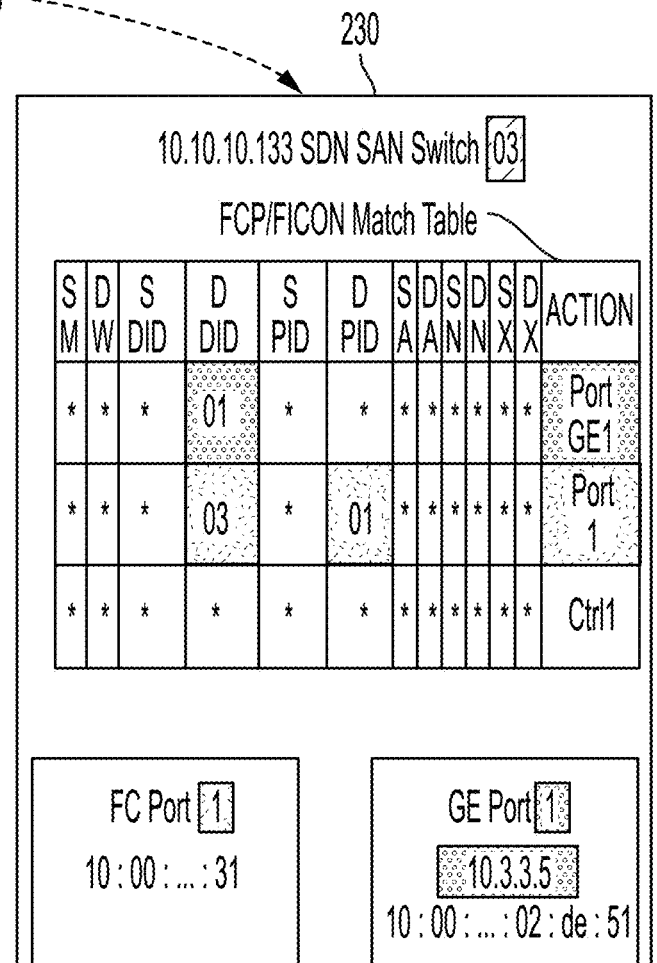
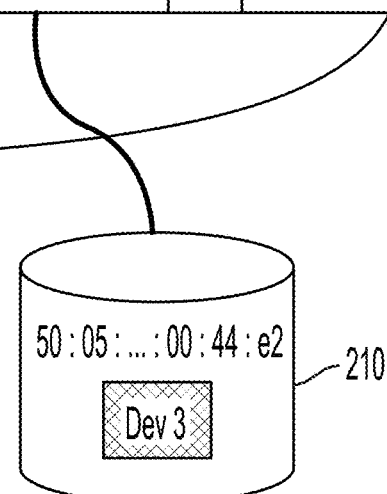

FIG. 36

Commands to implement FCIP routing ovs-ofctl --protocols=OpenFlow12,OpenFlow13
  --flow-format=OXM-OpenFlow12
  add-flow tcp:10.10.10.111 fcp
    did_dst=02,
    actions=output:ge1 ovs-ofctl --protocols=OpenFlow12,OpenFlow13
  --flow-format=OXM-OpenFlow12
  add-flow tcp:10.10.10.111 fcp
    did_dst=03,
    actions=output:ge2 ovs-ofctl --protocols=OpenFlow12,OpenFlow13
  --flow-format=OXM-OpenFlow12
  add-flow tcp:10.10.10.122 fcp
    did_dst=01,
    actions=output:ge1 ovs-ofctl --protocols=OpenFlow12,OpenFlow13
  --flow-format=OXM-OpenFlow12
  add-flow tcp:10.10.10.133 fcp
    did_dst=01,
    actions=output:ge1

FIG. 38

OpenFlow commands to set up a Brocade SAN FCIP/IPEX tunnel

3802:
```
add-flows --protocols=OpenFlow12,OpenFlow13
    --flow-format=OXM-OpenFlow12
    add-flow tcp:10.10.10.111 fcp
    dst_did=2,actions=output,ge1
```

3804:
```
add-flows --bundle
    --protocols=OpenFlow12,OpenFlow13
    --flow-format=OXM-OpenFlow12
    add-flow tcp:10.10.10.111 ip
    out_addr=10.8.8.5,actions=output:ge2
    add-flow tcp:10.10.10.111 ip
    in_addr=10.8.8.5,out_addr=10.9.9.5,
    actions=output:ge1
```

FIG. 39

OpenFlow commands to set up the network routes for FCIP/IPEX

```
add-flows --bundle
    add-flow tcp:10.10.10.110 ip
    in_addr=10.1.1.5,actions=output,ge8
    add-flow tcp:10.10.10.110 ip
    in_addr=10.2.2.5,actions=output,ge9
```

RECEIVE, BY A STORAGE AREA NETWORK (SAN) SWITCH CONFIGURED WITH AND MANAGED BY A SOFTWARE DEFINED NETWORKING (SDN) ARCHITECTURE, AT LEAST ONE TABLE, THE AT LEAST ONE TABLE COMPRISING THE SDN ARCHITECTURE AND ROUTING INFORMATION  4002

ROUTE, BY THE SAN SWITCH, TRAFFIC OVER A SAN USING THE ROUTING INFORMATION IN THE AT LEAST ONE TABLE  4004 ed. In addition to storing
EXTENSION TO SOFTWARE DEFINED NETWORKING TO MANAGE STORAGE AREA NETWORKS The following disclosures are submitted under 35 U.S.C. 102(b)(1)(A): DISCLOSURES: An Investigation and Design of Software Defined Networking Applied to Storage Area Network Connectivity, by Gary Allen Fisher, Sr., May 2020, 339 pages.

BACKGROUND

The present invention generally relates to computer systems, and more specifically, to computer-implemented methods, computer systems, and computer program products configured and arranged to provide an extension to software defined networking to manage storage area networks.

A storage area network (SAN) or storage network is a computer network which provides access to consolidated, block-level data storage. At its simplest, a SAN is a dedicated network for data storage. A SAN is a combination of hardware and software. SANs are primarily used to access storage devices, such as disk arrays and tape libraries from servers so that the devices appear to the operating system as direct-attached storage. A SAN typically is a network dedicated for Input/Output (I/O) operations with interconnections of any combination of servers, storage devices, and SAN switches, not accessible through the local area network (LAN). Although a SAN provides only block-level access, file systems built on top of SANs do provide file-level access and are known as shared-disk file systems. SANs are sometimes referred to as the network behind the servers and historically developed out of a centralized data storage model, but with its own data network. In addition to storing data, SANs allow for the automatic backup of data and the monitoring of the storage as well as the backup process.

SUMMARY

Embodiments of the present invention are directed to extensions to software defined networking (SDN) to manage storage area networks. A non-limiting example computer-implemented method includes receiving, by a switch configured with and managed by a SDN architecture, at least one table. The at least one table configured for use in the SDN architecture and including routing information. The method includes routing, by the switch, traffic over a storage area network (SAN) using the routing information in the at least one table.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of a match header in accordance with one or more embodiments of the present invention;

FIG. 7 depicts a block diagram of an extensible match field format in accordance with one or more embodiments of the present invention;

FIG. 8 depicts a block diagram of an extensible match field for a destination address in accordance with one or more embodiments of the present invention;

FIG. 9 depicts a block diagram of an extensible match field for a destination address subnet in accordance with one or more embodiments of the present invention;

FIG. 10 depicts a block diagram of an extensible match field for a destination port in accordance with one or more embodiments of the present invention;

FIG. 11 depicts a block diagram of an extensible match field for a destination address and destination port in accordance with one or more embodiments of the present invention;

FIG. 12 depicts a block diagram of extensible match type experimenter fields for SAN objects in accordance with one or more embodiments of the present invention;

FIG. 13 depicts a block diagram of extensible match type experimenter fields for SAN world-wide names in accordance with one or more embodiments of the present invention;

FIG. 14 depicts a block diagram of extensible match type experimenter fields for SAN domain identification in accordance with one or more embodiments of the present invention;

FIG. 15 depicts a block diagram of extensible match type experimenter fields for SAN port identification in accordance with one or more embodiments of the present invention;

FIG. 16 depicts a block diagram of extensible match type experimenter fields for SAN arbitrated loop address in accordance with one or more embodiments of the present invention;

FIG. 17 depicts a block diagram of extensible match type experimenter fields for SAN port number in accordance with one or more embodiments of the present invention;

FIG. 18 depicts a block diagram of extensible match type experimenter fields for SAN exchange identifier in accordance with one or more embodiments of the present invention;

FIG. 19A depicts a block diagram of extensible match type experimenter fields for virtual SAN identification, fabric identification, and/or virtual identification in accordance with one or more embodiments of the present invention;

FIG. 19B depicts the block diagram of the extensible match type experimenter fields for virtual SAN identification, fabric identification, and/or virtual identification, as a continuation of FIG. 19A, in accordance with one or more embodiments of the present invention;

FIG. 20 depicts a block diagram of extensible match type experimenter fields for SAN domain identification and SAN port address identification in accordance with one or more embodiments of the present invention;

FIG. 21 depicts a block diagram of extensible match type experimenter fields for SAN domain identification and SAN arbitrated loop address in accordance with one or more embodiments of the present invention;

FIG. 22 depicts a block diagram of extensible match type experimenter fields for SAN domain identification, SAN port address identification, and SAN arbitrated loop address in accordance with one or more embodiments of the present invention;

FIG. 24 depicts a block diagram of extensible match type experimenter fields for SAN virtual identification, SAN domain identification, SAN port address identification, and SAN arbitrated loop address in accordance with one or more embodiments of the present invention;

FIG. 26 depicts example commands to send SAN traffic for domain identification and port address identification to a port in FIG. 25 in accordance with one or more embodiments of the present invention;

FIG. 28 depicts example commands to send SAN traffic for a world-wide name to port in FIG. 27 in accordance with one or more embodiments of the present invention;

FIG. 30 depicts example commands to implement SAN zoning using world-wide names in FIG. 29 in accordance with one or more embodiments of the present invention;

FIG. 32 depicts example commands to implement zoning by domain name identification and port address identification in FIG. 31 in accordance with one or more embodiments of the present invention;

FIG. 33A depicts a block diagram of an SDN-managed SAN switch to implement inter-switch link selection in accordance with one or more embodiments of the present invention;

FIG. 34 depicts example commands to implement inter-switch link routing in FIGS. 33A, 33B, and 33C in accordance with one or more embodiments of the present invention;

FIG. 35C depicts the block diagram of the SDN-managed SAN switch to implement fiber channel over Internet protocol tunnel selection, as a continuation of FIGS. 35A and 35B, in accordance with one or more embodiments of the present invention;

FIG. 36 depicts example commands to implement fiber channel over Internet protocol routing in FIGS. 35A, 35B, and 35C in accordance with one or more embodiments of the present invention;

FIG. 38 depicts example commands to set up a SAN fiber channel over Internet protocol tunnel/Internet protocol extension tunnel in FIGS. 37A and 37B in accordance with one or more embodiments of the present invention;

FIG. 39 depicts example commands to set up the network routes for fiber channel over Internet protocol tunnel/Internet protocol extension used by a switch/router in FIGS. 37A and 37B in accordance with one or more embodiments of the present invention;

FIG. 40 is a flowchart of a computer-implemented process for using an extension to match tables in SDN to manage SANs in accordance with one or more embodiments of the present invention;

DETAILED DESCRIPTION

Figure 1:
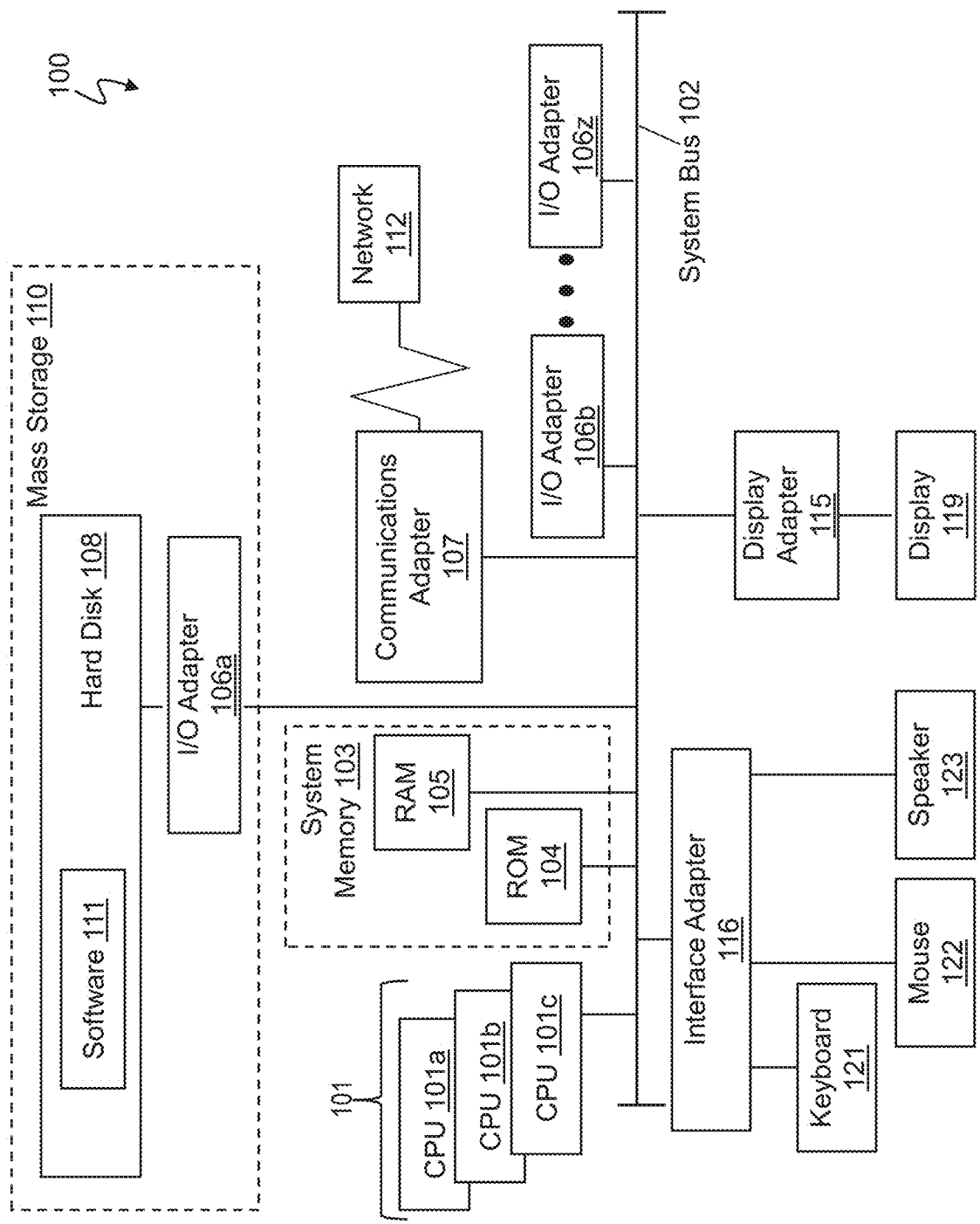
FIG. 1 depicts a block diagram of an example computer system for use in conjunction with one or more embodiments of the present invention.

One or more embodiments of the present invention provide computer-implemented methods, computer systems, and computer program products for generating and using extensions to software defined networking (SDN) to manage storage area networks (SANs). An SDN switch is managed by and operates using SDN and/or SDN architecture. An SDN switch that has SAN ports with or without LAN ports managed by SDN may be referred to as an SDN SAN switch, an SDN-managed SAN, a SAN with SDN architecture, etc. According to one or more embodiments, an SDN controller directs SDN switches to generate SDN match tables having extensions fields and/or experimenter fields, which are utilized to insert routing information that can be read/parsed by the SDN SAN. The SDN match tables are in an OpenFlow version 1.2 (v1.2) format and have an SDN architecture. The SDN SAN switch is configured to read incoming traffic including incoming frames having standard Transmission Control Protocol (TCP) TCP/Internet Protocol (IP) and/or standard Fibre Channel architecture and use the SDN match table to route the traffic through the appropriate SAN port of the SDN SAN switch over the SAN. Furthermore, one or more embodiments describe how to add SDN format constructs in SDN match tables to define SAN objects for use by SDN SAN switch in a storage area network.

Large enterprise data centers have many servers, storage, and network devices which are connected to each other to build versatile computing systems. Generally, at this time the Local Area Network (LAN) enables users and other servers to contact servers and is based on Ethernet, Internet Protocol (IP) and Transmission Control Protocol (TCP) and related standard protocols (e.g., UDP, ICMP). A SAN enables servers to contact data storage devices (storage) to access stored data, and/or enables storage to contact other storage for data replication. Both are based on copper or fiber for physical connections, with wireless increasingly used for LANs but not yet sufficiently capacious for most SAN requirements.

Large enterprises often have multiple data centers for resiliency against hardware failures, power outages, and natural disasters. The data in one data center can be replicated in the other data center(s) through various techniques. For example, Parallel Sysplex® from IBM® can make the data centers appear as one unit, where the applications can run in either data center and the data can reside in either data center, so any hardware or system failure does not affect the application and data availability. GDPS® from IBM automates the transition of the primary location of processing or data between sites in response to failures or business priorities, and which provides extremely high availability and performance.

Software Defined Networking (SDN) has been defined and refined to improve the speed and flexibility in configuring network Open System Interconnection (OSI) Layer 2 switches (for Ethernet) and OSI Layer 3 routers (for Internet Protocol, or IP) as part of its five goals: Plane separation, Simplified device, Centralized control, Network automation and virtualization, and Openness.

Storage Area Networks (SANs) use either the Fibre Channel Protocol (FCP) or FICON® from IBM. Although there have been several FCP switch vendors in the past, there are now only two. While the technology is standardized, the implementation by each vendor is proprietary and no longer inter-operable, is expensive, and is complex to configure and manage, thereby requiring specialized skills and personnel.

LANs and SANs are similar in many ways and often connect to the same servers that perform both input/output (I/O) and network tasks. Also, when data centers are separated by a significant distance (typically greater than 10 kilometers), SAN traffic can be encapsulated on the LAN using Fibre Channel over IP (FCIP), so the LAN is carrying both traditional network and I/O traffic. One vendor, Brocade, has implemented IP Extension (IPEX), where certain LAN traffic is carried on the FCIP network which is already on a LAN, in order to consolidate management tasks for communications that are functionally similar but carried on both LAN and SAN. FCIP and IPEX implementation further requires specialists in both SAN, LAN, and WAN.

Data Center Bridging (DCB) and Converged Enhanced Ethernet (CEE) attempted to merge LAN and SAN on a common infrastructure. NAS (network addressable storage) and iSCSI (IP-based Small Computer System Interface) discard the SAN altogether. Even with these efforts, however, LANs and SANs require different tools and skills for conceptually similar tasks.

SDN is not only used to control network routers at Layer 3 and switches at Layer 2 but has been extended to control physical switches and Dense Wavelength Division Multiplexors (DWDMs) at OSI Layer 1. Software Defined Networking does not manage the Storage Area Network (SAN) switches. FCIP, IPEX, and NVMEoFC (Non-Volatile Memory extended traffic over Fibre Channel) are attempting to blend the paths of network and storage, but there is not an orchestrated controlling function for this combined mesh of connectivity. One or more embodiments of the invention provide configurations of software defined networking to manage FC ports on SDN switches, thereby managing the SAN through SDN.

As discussed herein, one or more embodiments describe how SDN can be extended to manage SANs. There are many efficiencies with reduced and combined management techniques of similar and inter-leaved infrastructures. SDN can be applied to SANs not just for a single data center, but for other forms of inter-system communication used when connecting remote data centers according to one or more embodiments. Also, with SDN, different routing techniques can be implemented, such as those found in social and financial networks, that provide improved inter-data-center connectivity when satisfying the different requirements of SANs and LANs. Combining SAN and LAN with SDN according to one or more embodiments integrates a variety of techniques rather than have them manage similar problems separately. Accordingly, a single, common infrastructure management plane encompasses LAN, SAN, WAN (Wide Area Network), and L1 devices, which redundantly share and intertwine much of the same connectivity infrastructure, as provided in accordance with one or more embodiments. According to the improved methods discussed in one or more embodiments, a user would not need to know of the layers or architectures of the intervening connectivity devices. Rather, all devices use the same control interface (e.g., SDN). Connectivity between devices that spans multiple types of controlled devices at different layers (e.g., storage, FC, FCIP, and L3 routing) is orchestrated from a single control point that integrated all the changes, according to one or more embodiments.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, smartphone, SDN controller, and/or SDN switch. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, ASIC (Application Specific Integrated Circuit) or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises input/output (I/O) adapters such as input/output (I/O) adapters 106a, 106b, 106z and a communications adapter 107 coupled to the system bus 102. The I/O adapters 106a, 106b, 106z can be a small computer system interface (SCSI) adapter or Fibre Channel (FC) adapter that communicates with the I/O adapter of a hard disk 108 and/or any other component. The I/O adapter 106a and the hard disk 108 are collectively referred to herein as a mass storage 110. The I/O adapters 106b, 106z can be directly attached to an I/O adapter and/or attached to a Storage Area Network (SAN) by connecting to a Fibre Channel (FC) port of a SAN switch (e.g., one or more of ports 260 of SDN SAN switch 230 depicted in FIG. 2).

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
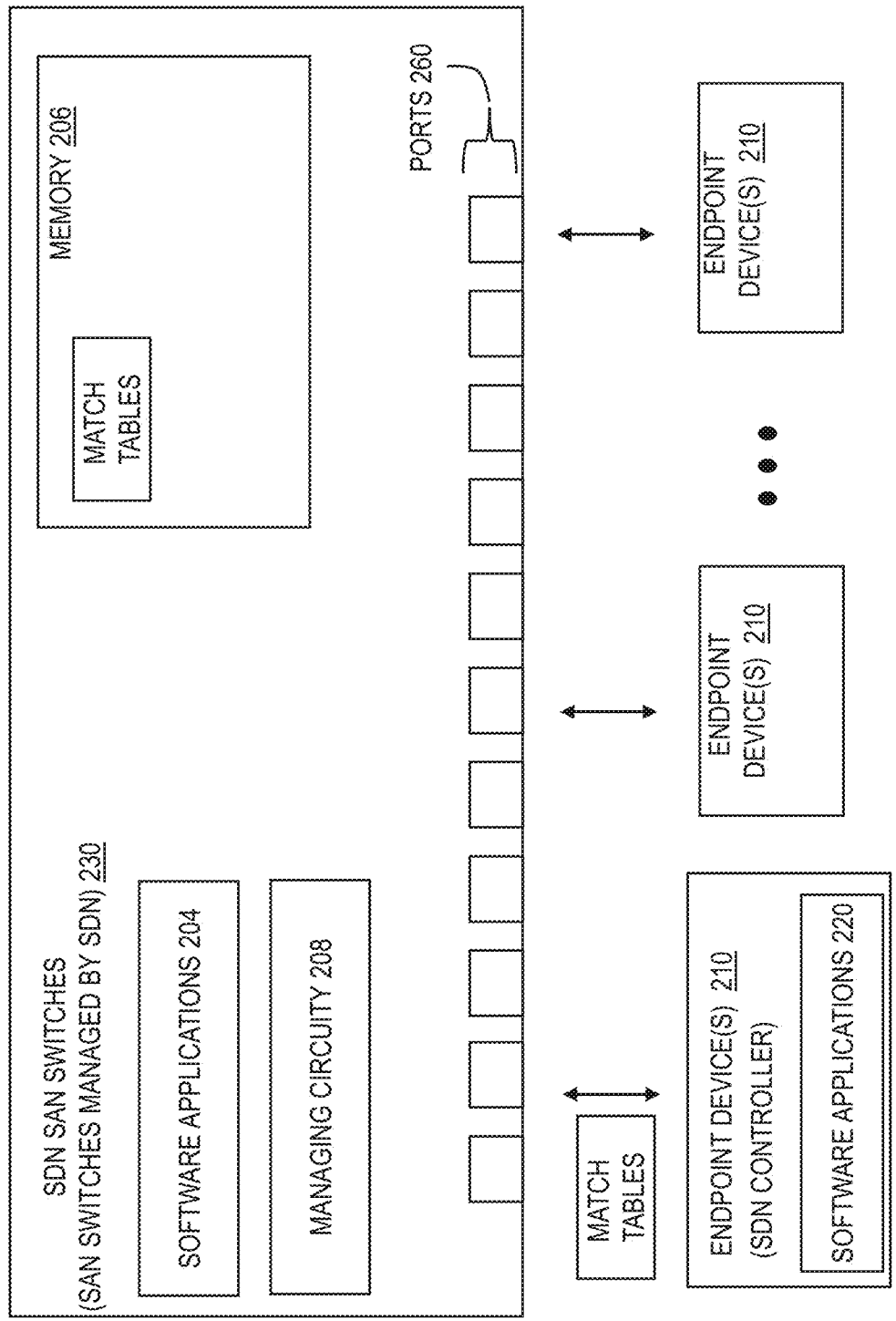
FIG. 2 depicts a block diagram of a system for a storage area network (SAN) in accordance with one or more embodiments of the present invention.

FIG. 2 is a high-level schematic diagram of a storage area network (SAN) 200 in accordance with one or more embodiments of the present invention. SAN 200 includes a plurality of endpoint devices 210 that are each connected to one or more network devices, such as SAN switches 230. As discussed herein, SAN switches 230 are managed by SDN and may be referred to as an SDN SAN switch, an SDN-managed SAN, a SAN with SDN architecture, etc. Additionally, the SAN switches 230 can be representative of an SDN switch having been modified to process SAN traffic over SAN ports as discussed herein according to one or more embodiments. Moreover, according to one or more embodiments of the invention, SAN switches 230 can process both SAN traffic over SAN ports and TC/IP (i.e., LAN) traffic over LAN ports. SAN switches 230 include memory circuitry and processing circuitry (e.g. including monitoring circuitry and limiting circuitry). The network topology of SAN 200 may be a switched fabric using SAN switches 230. In one or more embodiments, a particular SAN switch 230 that is a switch may be set to switch mode or N-port ID virtualization (NPIV) mode. In one or more embodiments, at least one of the endpoint devices 210 in SAN 200 is configured as an SDN controller. In one or more embodiments, the SDN controller as endpoint device 210 includes functions of and/or is embodied in a computer system, such as computer system 100 shown in FIG. 1. SDN controller can include software applications 220 implemented, for example, as software 111 executed on one or more processors 101, as discussed in FIG. 1. Using, for example, software applications 220, the SDN controller as one or more as endpoint devices 210 is configured to generate match tables, which are SDN match tables with modified experimenter fields of the extension fields to thereby include new routing information useable for routing in SAN 200 according to one or more embodiments. The software applications 220 of SDN controller downloads and/or sends the match tables to SAN switches 230 along with updates to the match tables. One or more match tables can be stored in memory 206 and updated by software applications 220 of SDN controller. Once received, SAN switches 230 process the modified match tables according to one or more embodiments. SAN switches 230 can include software applications 204 implemented, for example, as software 111 executed on one or more processors 101, as discussed in FIG. 1. Software applications 204 of SAN switches 230 are configured to process incoming traffic (e.g., frames, packets, etc.) received from endpoint device 210 according to (new) routing information in the match table and send the traffic to another endpoint device 210 in SAN 200, in accordance with one or more embodiments. SAN switches 230 may include managing circuitry 208 in which managing circuitry 208 is configured and arranged to include forwarding circuitry, data plane circuitry, etc. Further, any of the endpoint devices 210 and SAN switches 230 can be implemented using any of the functions and hardware and software components described in computer system 100. Examples of endpoint devices 210 which are not the SDN controller may include mail servers, applications servers, database servers, tape storages, optical storages, hard disk drives, solid state drives, other switches some of which may connect to other endpoint devices, etc. In some cases, SANs 200 are used to efficiently attach many servers running applications that need access to the stored data on many storage devices. A SAN switch (also called a FICON Director) significantly reduces the number of connections.

Although only one SAN switch 230 is illustrated for simplicity, it should be understood that there are numerous SAN switches 230 connected to each other and connected to various endpoint devices 210 in many configurations, as understood by one of ordinary skilled in the art. In one or more embodiments, each of the SAN switches 230 includes a plurality of ports 260 that connect the SAN switches 230 to various endpoint devices 210 via links. Ports 260 can include a variety of ports including FC ports, LAN ports, along with any combination of the ports discussed herein. In addition, each endpoint device 210 includes one or more ports that connect the end devices to one or more SAN switches 230 and/or to other endpoint devices 210. In one or more embodiments, each link can have at least two ports that are connected to the link. The ports of endpoint devices 210 can be referred to as channel ports and/or host bus adapter ports while the ports of SAN switches 230 are referred to as switch ports.

In one or more embodiments, the SAN switches 230 support the Fibre Channel (FC) and/or Fibre channel over Ethernet (FCoE) Protocols. For example, a particular fixed port network device may support the FC protocol and/or the FCoE protocol. As another example, if a particular SAN switch 230 includes a plurality of line cards, at least some of which may support the FC protocol and/or at least some of which may support the FCoE protocol. It is noted that a particular port 260 on a particular SAN switch 230 may support the FC protocol or the FCoE protocol by default and/or as configured (e.g., if the particular port is a universal port). Optionally, SAN switches 230 support one or more other protocols such as simple network management protocol (SNMP) for collecting information, e.g., for output on the management device implemented as endpoint device 210.

For explanation purposes and ease of understanding, section headings and/or titles are provided below. The section headings and/or titles are not meant to be limiting.

I. Software Defined Networking

Software Defined Networking (SDN) virtualizes existing Internet Protocol (IP) networks, allows flexible and rapid response to a variety of requirements, allows network engineers to simplify, automate network management, use open protocols, reduce cost, and innovate. For explanation purposes and not limitation, examples and illustrations may use OpenFlow® software. OpenFlow is a protocol that provides a simple method for orchestration of network devices in a non-proprietary method. Initially intended to allow networking researchers to try different network management schemes without the extensive delay and effort of designing and implementing specialized hardware, it became the precursor to what is now called Software Defined Networking. OpenFlow is governed by the Optical Internetworking Forum (OIF), a consortium to facilitate interoperable networking solutions.

The OpenFlow specification has goals of: Plane separation, Simplified device, Centralized control, Network automation and virtualization, and Openness. In the forwarding plane versus the control plane, a network device is responsible for sending a message coming from an input port to the desired output port, a process called forwarding. Forwarding tables, routing tables, address resolution protocol (ARP) caches and such are referenced by the forwarding plane, often with special purpose circuitry to make the reference as fast as possible. If a single processor on a network device is responsible to respond to administrative commands that create and maintain the device's configuration (such as routing tables), as well as for the heavy load of forwarding, it might either slow down the forwarding or be very slow to respond to the management commands. Thus, network devices have multiple processors (e.g. chips), some to respond to management functions and the most important, special purpose, and expensive processors to implement the forwarding functions. These levels of functions are grouped: Forwarding Plane moves packets from input to output, also called the Data Plane; Control Plane determines how packets should be forwarded; management plane uses methods of configuring the control plane. Most of the heavy work is done in the forwarding plane, with special purpose processors, as mentioned. The management plane interacts with the administrator or automation. The control plane takes the instruction from the management plane and interacts with the tables that the forwarding plane needs.

By way of example using routing updates, the forwarding plane uses current routing table to send packets. The control plane is responsible for updating the routing table with updates from other routers, when a new route is presented, or if a router or path fails and alternate routes should be calculated and distributed. The management plane described which routing protocol to use and perhaps some personalization, such as the routers open shortest path first (OSPF) area number.

One benefit of centralizing the control plane is allowing forwarding decisions to be made globally across the SDN domain rather than at each hop. Normally, a spanning tree (a control plane process) is needed to guard against loops because no individual switch knows what the entire network looks like. However, if the control plane functions for all switches are offloaded to a central controller (e.g., such as SDN controller as one of the endpoint devices 210 according to one or more embodiments), that controller can view the complete network and install forwarding decisions to each controlled switch based upon the desired end-to-end path for each flow while keeping all links active.

Another benefit of having a central controller is a programming interface to allow other applications to control network resources and influence forwarding decisions. For example, if a virtual machine is moved from one physical host to another, the controller could automatically migrate any associated firewall or Quality of Service (QoS) policies (forwarding plane) on the network. This removes the need for a human administrator to reconfigure network resources and allows the entire network to quickly adjust to the processing requirements.

Plane separation can separate the forwarding and control functions. The forwarding plane (or data plane) is the primary function of the switch, moving packets from the sending port to the receiving port. In SDN, the functions the forwarding plane can perform on a packet are reduced to forward, drop, consume, and replicate. The control plane includes the protocols and algorithms to modify how the forwarding plane does its job, traditionally setting up routing tables and access control lists. In SDN, it manages the tables the provide the instructions for the forwarding plane. Traditionally, these co-reside in the physical switch. Initially, they were on the same hardware, but the control functions would take precious CPU cycles from the forwarding functions and either cause the forwarding functions to slow down unacceptably or cause the control functions to have very poor response time. A control function running on a general-purpose processor that managed the forwarding functions running on the high-speed and specialized switching processor fixed that. However, the control function was still highly integrated with the hardware, and thus proprietary and closed. Other characteristics of SDN switches and controllers are that they provide a simplified device, centralized control, network automation and virtualization, and openness.

Figure 3A:
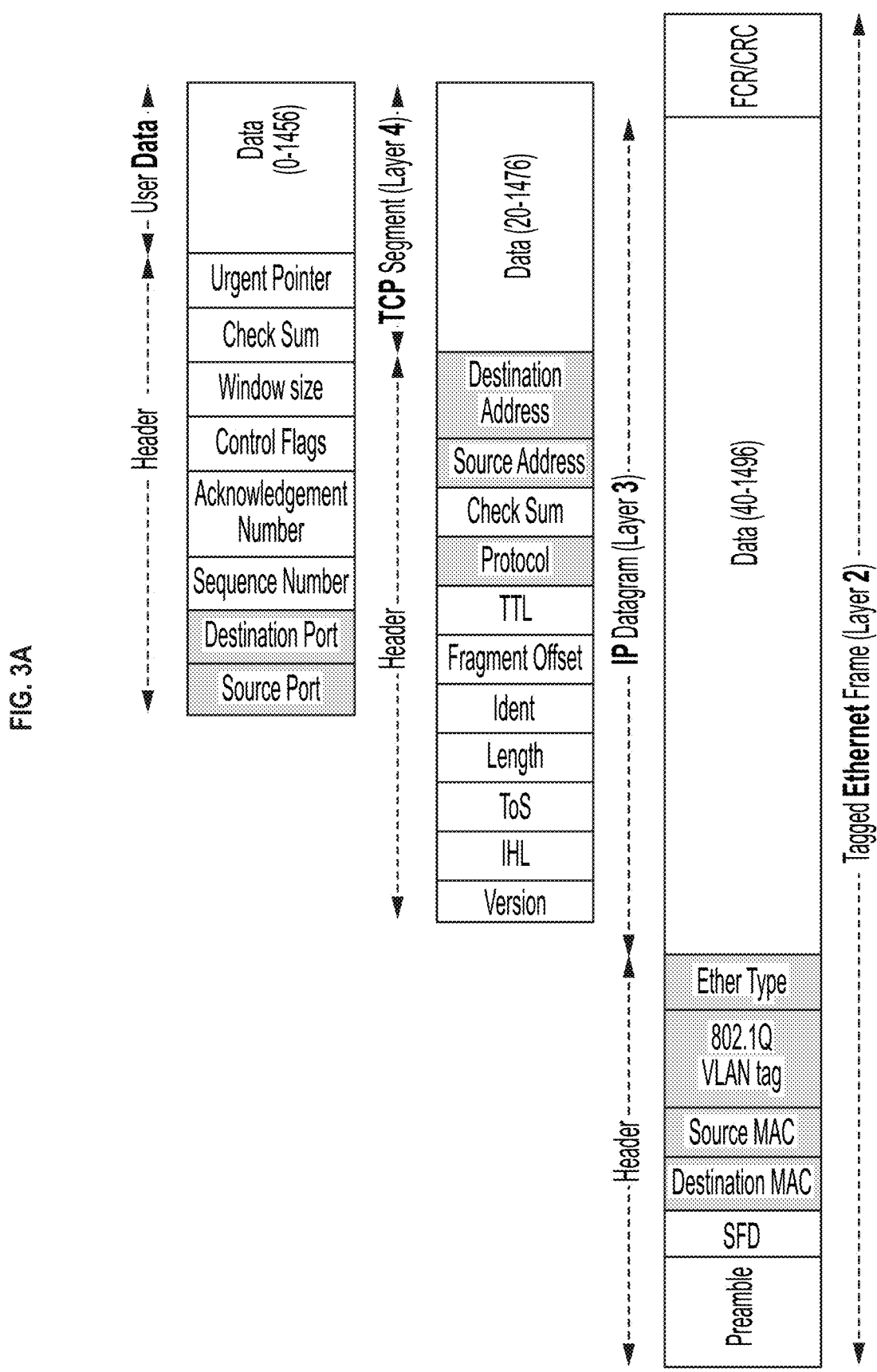
FIG. 3A depicts Transmission Control Protocol (TCP) TCP/Internet Protocol (IP) fields examined in match tables in accordance with one or more embodiments of the present invention.
Figure 3B:
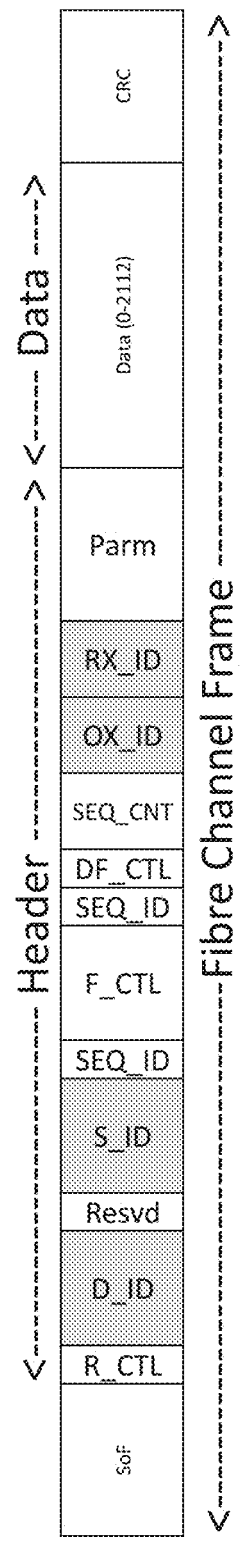
FIG. 3B depicts SAN fields examined in match tables in accordance with one or more embodiments of the present invention.

OpenFlow was intended to handle all required network functions. Thus, OpenFlow is to determine characteristics of each packet, with the fields shown in gray both within and above the network layer where they are located, as shown in FIGS. 3A and 3B. Particularly, FIG. 3A depicts fields examined in OpenFlow match tables used to process, for example, L2, L3, and L4 packets. Recall the TCP segment is the payload of the IP datagram, which is the payload of the Ethernet frame, so all fields are available when looking at the L2 Ethernet frame that comes into any TCP/IP network switch. For comparison, FIG. 3B depicts SAN fields, that are present in all FC frames, examined in match tables in accordance with one or more embodiments of the present invention.

Figure 4:
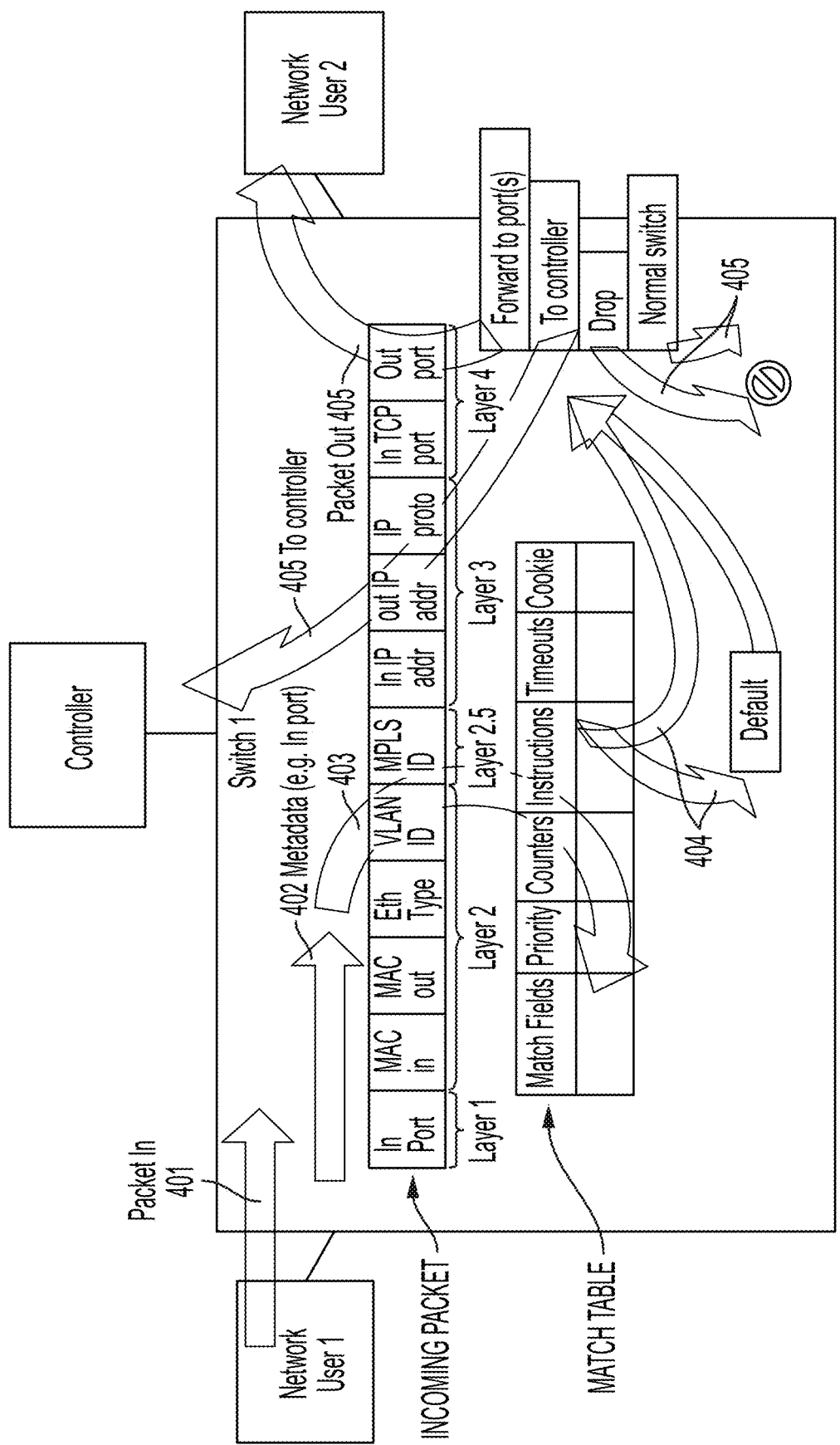
FIG. 4 depicts a block diagram of switch processing in accordance with one or more embodiments of the present invention.

The processing of an OpenFlow switch is shown in FIG. 4. A network user or device sends a packet at stage 401. The OpenFlow switch can examine the contents of the packet, as well as collect additional metadata such as the ingress port number at stage 402. The fields of the incoming packet are compared against the match fields in the match table. OpenFlow defines a match table which contains entries for fields found in an incoming packet. Multiple matches are resolved by the priority field specification. If no match is found, there is a default instruction at stage 404, but if a match is found the instructions field specifies what the switch should do with the packet at stage 404. The instruction is implemented at stage 405 can include: forward to a port (or replicate to multiple ports); send to the controller for further processing (which might cause a new match rule to be created and sent to the switch for the next such packet); drop the packet (e.g. firewall rule is not satisfied); and send the packet to the "normal" TCP/IP switch processing, which might be forwarding via layer 2, or routing via layer 3 functions.

Figure 5:
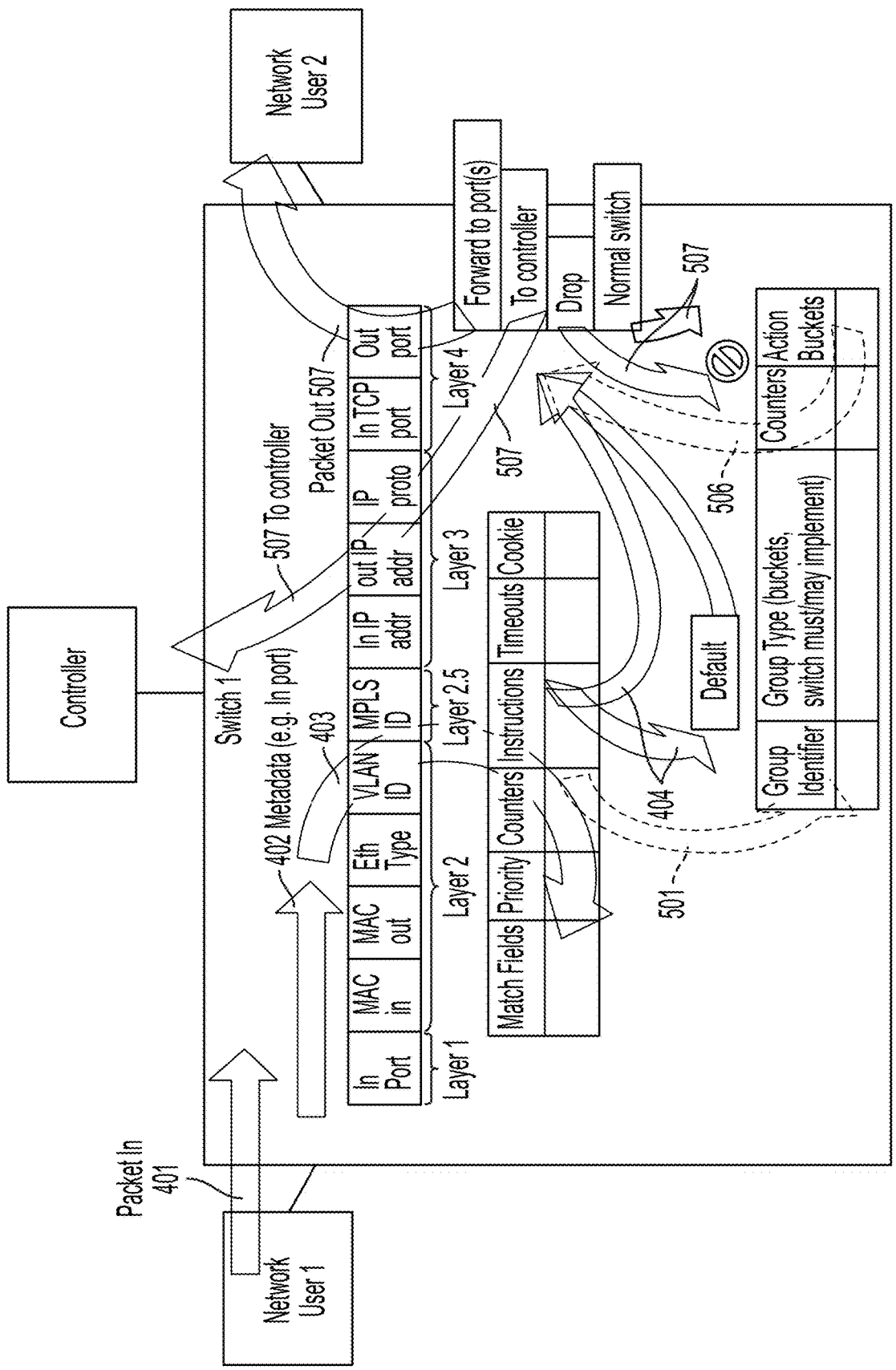
FIG. 5 depicts a block diagram of switch processing in accordance with one or more embodiments of the present invention.

The next iteration of the OpenFlow specification addressed some issues that were identified with early prototypes and usage scenarios. The primary addition was group tables which simplified the management of the control plane directives where multiple objects with the same rules would point to the same group table, rather than replicate the rules. The processing is shown in FIG. 5. In the OpenFlow switch processing in v1.1, the additional group table processes are shown at stages 501 and 506. Stage 507 in FIG. 5 is analogous to 405 in FIG. 4. Group-Based Policy (GBP) is a concept from OpenStack and the Neutron virtual network process. OpenStack allows Local Area Network domains to be summarized and not treated as a special type of network. Group Tables in OpenFlow further enable that concept.

The changes in v1.2 of the OpenFlow specification include the addition of a new match type, called "Extensible Match" types, which greatly enhanced and simplified the match tables and which are used in accordance with one or more embodiments of the invention to implement compatibility on the hardware of a SAN being managed using SDN as discussed herein. Extensible Matches changed static length match fields into variable length. Now, all match table entries are where the OFPMT_OXM field in the match type header has value 0x0001, shown in FIG. 6. It is noted that the name is made up of OFP for "OpenFlow Protocol", MT for "Match Type", and OXM for "Open eXtensible Match". An extensible match field can include the following: existing match classes from OpenFlow v1.0 or v1.1, values 0x0000-0x7000; new match classes that might be officially added to the specification, values 0x8000-0xFFFE; and an "Experimenter" class, value 0xFFFF, which is utilized for dynamic additions to the switch function to allow for the implementation of the SAN being managed using SDN in accordance with one or more embodiments.

An OpenFlow 1.2 extensible field table entry is a header (with type=0x0001), shown in FIG. 6, followed by zero or more oxm_fields, shown in FIG. 7. FIG. 6 depicts ofp_match using OpenFlow v1.3 match header. In FIG. 6, the body of the oxm_fields are TLV (Type, Length, Value) format. The basic format of an OpenFlow match field, without header, is shown in FIG. 7. FIG. 7 depicts OXM_fields in OpenFlow v1.3 Extensible Match Field format.

In FIG. 7, the type is the combination of the OXM_class and OXM_field, to make a 23-bit long OXM_type. OXM_class, 16 bits long, describes the type of match record. OXM_field, 7 bits long, specifies a match field within the class. Next, the OXM_hasmask field is a single bit that specifies if there is a bitmask in the match payload. The OXM_Length, 8 bits long, specifies the length of the match payload. Finally, the payload or value of the match is padded to make the whole match field, including the header, a multiple of 8 bytes long. If the OXM_Hasmask bit is set to 1, the payload is twice as long as the value, and the following applies: (i) A mask bit position containing a 1 means "match exactly". When a mask bit is 1, if the value in the same bit position of the payload matches the incoming packet contents, the state continues to be "matches" until all the bits are compared. If the value is not the same in any bit position, the state is "does not match". (ii) A mask bit position containing a 0 means "ignore" or "don't care". When a mask bit is 0, whatever value is in the same bit position of the payload value does not change the overall "matches" or "does not match" state.

FIG. 8 depicts an OpenFlow extensible match field for a destination Internet Protocol version 4 (IPv4) address (i.e. IP address). A similar example, except for all addresses in the Class C subnet of 192.168.1.0/24, is shown in FIG. 9 (e.g. IP subnet, i.e. address with bitmask). Note that if the oxm_hasmask bit-length field is 1, the OXM_Length is doubled, and the bitmask (shaded) follows the field containing the bits to match. FIG. 9 depicts an OpenFlow extensible match field for a destination IPv4 subnet. An example of a match of destination port 80 is shown in FIG. 10 (e.g. TCP port), where the OXM_Class value is used for the TCP destination port number, TCP DST (14 in decimal, 0E in hexadecimal). An example of a match of both destination IP address of 192.168.1.1 and destination port 80 is shown in FIG. 11 (e.g. a TCP/IP address and port combined). FIG. 11 depicts an OpenFlow extensible match field for a destination IP address and destination TCP port.

As discussed herein, one or more embodiments of the invention utilize the experimenter match fields of the extensible match field to enable SAN identifiers to be utilized by SAN switches incorporating an SAN architecture. Particularly, one or more embodiments use SDN to manage SAN switches.

II. Using Match Tables of Software Defined Networking to Manage Storage Area Networks One or more embodiments of the invention describe techniques to use the experimenter fields in the match table of SDN to manage SAN switches 230. By way of example, various examples using OpenFlow to manage SAN structures are described in accordance with one or more embodiments, and it should be appreciated that embodiments are not limited to OpenFlow software. OpenFlow specification 1.2 defines an "experimenter" match class, value 0xFFFF. As noted herein, the header for all match type fields was changed to be the "extensible match type", as shown in FIG. 6. Match fields defined before v1.2 have a "standard" match type, to allow co-existence.

If an OpenFlow table entry has the extensible match class, it has extensible fields to describe TLV (type-length-value) match entries which are utilized according to one or more embodiment. Particularly, one or more embodiments define a variety of new experimenter match class fields illustrated in FIG. 12 for use with SAN switches managed using SDN. Using OpenFlow Extensible Match type experimenter fields, FIG. 12 depicts a variety of new SAN class and field combinations for SAN objects according to one or more embodiments. With those structures illustrated in FIG. 12, SDN switches can match on the WWPN (world wide port name), the Domain and Port Address, the Exchange ID of the source or destination in a SAN, and/or any combination, both locally and between distant sites. These fields are described further in detail herein.

By way of example using the Ubuntu® open switch control command open virtual switch open flow control (ovs-ofctl), these extensible match field types can be added to existing OpenFlow switches, as shown in Table. Table 1 illustrates Ubuntu commands to add extensible match types for SAN switches managed by SDN according to one or more embodiments. The example commands in Table 1 correspond to the example extensible match type experimenter fields in FIG. 12, which are executed by the SAN switch managed using SDN according to one or more embodiments. It is noted that switch01 would be replaced with TCP/IP-address or similar directive and is a place holder.

TABLE 1

| | |
|---|---|
| Add SAN Source WWN (world wide name) | ovs-ofctl add-TLV-map switch01 "{class=0xffff,type=0x71,len=8}->tun_metadata1" ovs-ofctl add-flow switch01 tun_metadata1=0071,actions=controller |
| Add SAN Destination WWN | ovs-ofctl add-TLV-map switch01 "{class=0xffff,type=0x72,len=8}->tun_metadata2" ovs-ofctl add-flow switch01 tun_metadata2=0072,actions=controller |
| Add SAN Source Domain ID | ovs-ofctl add-TLV-map switch01 "{class=0xffff,type=0x73,len=1}->tun_metadata3" ovs-ofctl add-flow switch01 tun_metadata3=0073,actions=controller |
| Add SAN Destination Domain ID | ovs-ofctl add-TLV-map switch01 "{class=0xffff,type=0x74,len=1}->tun_metadata4" ovs-ofctl add-flow switch01 tun_metadata4=0074,actions=controller |
| Add SAN Source Port ID | ovs-ofctl add-TLV-map switch01 "{class=0xffff,type=0x75,len=1}->tun_metadata5" ovs-ofctl add-flow switch01 tun_metadata5=0075,actions=controller |
| Add SAN Destination Port ID | ovs-ofctl add-TLV-map switch01 "{class=0xffff,type=0x76,len=1}->tun_metadata6" ovs-ofctl add-flow switch01 tun_metadata6=0076,actions=controller |
| Add SAN Source Arbitrated Loop ID | ovs-ofctl add-TLV-map switch01 "{class=0xffff,type=0x77,len=1}->tun_metadata7" ovs-ofctl add-flow switch01 tun_metadata7=0077,actions=controller |
| Add SAN Destination Arbitrated Loop ID | ovs-ofctl add-TLV-map switch01 "{class=0xffff,type=0x78,len=1}->tun_metadata8" ovs-ofctl add-flow switch01 tun_metadata8=0078,actions=controller |
| Add SAN Source Port Number | ovs-ofctl add-TLV-map switch01 "{class=0xffff,type=0x79,len=2}->tun_metadata9" ovs-ofctl add-flow switch01 tun_metadata9=0079,actions=controller |
| Add SAN Destination Port Number | ovs-ofctl add-TLV-map switch01 "{class=0xffff,type=0x7a,len=2}->tun_metadata10" ovs-ofctl add-flow switch01 tun_metadata10=007a,actions=controller |
| Add SAN Source Exchange ID | ovs-ofctl add-TLV-map switch01 "{class=0xffff,type=0x7b,len=4}->tun_metadata11" ovs-ofctl add-flow switch01 tun_metadata11=007b,actions=controller |
| Add SAN Destination ExchangeI D | ovs-ofctl add-TLV-map switch01 "{class=0xffff,type=0x7c,len=4}->tun_metadata12" ovs-ofctl add-flow switch01 tun_metadata12=007c,actions=controller |
| Add SAN Source VID (VSAN/FID) | ovs-ofctl add-TLV-map switch01 "{class=0xffff,type=0x7d,len=2}->tun_metadata11" ovs-ofctl add-flow switch01 tun_metadata11=007d,actions=controller |
| Add SAN Destination VID (VSAN/FID) | ovs-ofctl add-TLV-map switch01 "{class=0xffff,type=0x7e,len=2}->tun_metadata12" ovs-ofctl add-flow switch01 tun_metadata12=007e,actions=controller |

Various examples of at least a part of match tables in SDN architecture to be used with SAN switches 230 are described herein and are not meant to be limited. Although specific example match tables are described, one or more experimenter fields in the example match tables can be combined as understood by one skilled in the art.

Turning to an example for SDN experimenter match class for SAN World Wide Name for execution by the SAN switch 230 managed by SDN, a match table could have an entry for a OFPXMCF_SANSWWN or OFPXMCF_SANDWWN (SAN Source and Destination WWPN, respectively), or both, according to one or more embodiments. Particularly, FIG. 13 depicts an example match table with OpenFlow Extensible Match field OFPXMCF_SANSWWN according to one or more embodiments. In FIG. 13, the length is 16 bytes. The content of the match table includes 4 bytes for the OXM header which includes 2 bytes for the OFPMT_OXM=OFPMT_XM=1 and 2 bytes for the length of the match fields payload, 0x10 (that is, 0010 in hexadecimal). The content includes WWN match class which includes 2 bytes for the OXM_Class, value 0xFFFF, indicating the experimenter class; 1 byte for the OXM_Field (and OXM_HASMASK bit), value either 0x71 (destination WWN) or 0x72 (source WWN); and 1 byte for the length of the match payload, OXM_Length, value of 0x08. Also, the content includes 8 bytes for the WWN value in hexadecimal, FIG. 13 showing an example WWN typically expressed as 10:00:c4:f5:7c:1d:25:a0.

Regarding an example SDN experimenter match class for SAN Domain Identifier for execution by the SAN switch 230 managed by SDN, a match table could have an entry for a OFPXMCF_SANSDID and OFPXMCF_SANDDID (SAN Source and Destination Domain ID, respectively), or both, according to one or more embodiments. Particularly, FIG. 14 depicts an example match table with OpenFlow Extensible Match field OFPXMCF_SANSDID according to one or more embodiments. In FIG. 14, the length is 16 bytes. The content of the match table includes 4 bytes for the OXM header which include 2 bytes for the OFPMT_OXM=OFPMT_XM=1 and 2 bytes for the length of the match fields payload, 0x09. In the match table, the DID match class includes 2 bytes for the OXM_Class, value 0xFFFF, experimenter class; 1 byte for the OXM_Field (and OXM_HASMASK bit), value either 0x73 (destination Domain ID) and 0x74 (source Domain ID); 1 byte for the length of the match payload, OXM_Length, value of 0x01; and 1 byte for the Domain ID, value in hexadecimal, FIG. 14 showing an example domain ID of 1. The content includes 7 pad bytes not examined but required to make the structure a multiple of 8 bytes long.

Regarding an example for SDN experimenter match class for SAN Port Address for execution by the SAN switch 230 managed by SDN, a match table could have an entry for a OFPXMCF_SANSPID or OFPXMCF_SANDPID (SAN Source and Destination Port ID, respectively), or both, according to one or more embodiments. Particularly, FIG. 15 depicts an example match table with OpenFlow extensible match field OFPXMCF_SANSPID according to one or more embodiments. In FIG. 15, the length is 16 bytes. In the match table, the content includes 4 bytes for the OXM header which includes 2 bytes for the OFPMT_OXM=OFPMT_XM=1 and 2 bytes for the length of the match fields payload, 0x09. In the match table in FIG. 15, the PID match class includes 2 bytes for the OXM_Class, value 0xFFFF, experimenter class; 1 byte for the OXM_Field (and OXM_HASMASK bit), value either 0x75 (destination Port ID) or 0x76 (source Port ID); 1 byte for the length of the match payload, OXM_Length, value of 0x01; and 1 byte for the Port ID, value in hexadecimal, 0xC0 as an example. Also, the content includes 7 pad bytes not examined but required to make the structure a multiple of 8 bytes long.

Turning to an example for SDN experimenter match class for SAN Arbitrated Loop Address for execution by the SAN switch 230 managed by SDN, a match table could have an entry for a OFPXMCF_SANSALA or OFPXMCF_SANDALA (SAN Source and Destination Arbitrated Loop Address, respectively), or both, according to one or more embodiments. Particularly, FIG. 16 depicts an example match table with OpenFlow Extensible Match field OFPXMCF_SANSALA according to one or more embodiments. In FIG. 16, the example format has length of 16 bytes, and the content includes 4 bytes for the OXM header which has 2 bytes for the OFPMT_OXM=OFPMT_XM=1 and 2 bytes for the length of the match fields payload, 0x09. In the match table of FIG. 16, the ALA match class includes the following: 2 bytes for the OXM_Class, value 0xFFFF, experimenter class; 1 byte for the OXM_Field (and OXM_HASMASK bit), value either 0x77 (destination Arbitrated Loop Address) or 0x78 (source Arbitrated Loop Address); 1 byte for the length of the match payload, OXM_Length, value of 0x01; and 1 byte for the Arbitrated Loop Address, value in hexadecimal, 0x80 as an example. In FIG. 16, the match table also includes 7 pad bytes not examined but required to make the structure a multiple of 8 bytes long.

Regarding an example for SDN experimenter match class for SAN Port Number for execution by the SAN switch 230 managed by SDN, a match table could have an entry for a OFPXMCF_SANSPNO or OFPXMCF_SANDPNO (SAN Source and Destination switch Port Number, respectively), or both, according to one or more embodiments. Particularly, FIG. 17 depicts an example match table with OpenFlow Extensible Match field OFPXMCF_SANSPNO according to one or more embodiments. The port number on the SAN switch chassis is constant based on the physical location, but the port ID (also called the port address) is dynamically defined on vendor SAN switches (e.g., both Cisco® and Brocade® SAN switches). The port address is used for the F Port address obtained in the FLOGI (i.e., the Fabric Login phase of Fibre Channel Standard link initialization) and is also used in the source-based routing of the mainframes' I/O definition. In the match table in FIG. 17, the length is 16 bytes, and the content includes 4 bytes for the OXM header which includes 2 bytes for the OFPMT_OXM=OFPMT_XM=1 and 2 bytes for the length of the match fields payload, 0x09. In the match table in FIG. 17, the content includes the following: NUM match class which includes 2 bytes for the OXM_Class, value 0xFFFF, experimenter class; 1 byte for the OXM_Field (and OXM_HASMASK bit), value either 0x79 (destination Port Number) or 0x7A (source Port Number); 1 byte for the length of the match payload, OXM_Length, value of 0x01; and 2 bytes for the Port Number, value in hexadecimal, 0x0002 as an example. The match table in FIG. 17 also has 6 pad bytes not examined but required to make the structure a multiple of 8 bytes long.

Turning to an example for SDN experimenter match class for SAN Exchange Identifier for execution by the SAN switch 230 managed by SDN, a match table could have an entry for a OFPXMCF_SANSXID or OFPXMCF_SANDXID (SAN Source and Destination Exchange ID, respectively), or both, according to one or more embodiments. Particularly, FIG. 18 depicts an example match table with OpenFlow Extensible Match field OFPXMCF_SANSXID according to one or more embodiments. In the match table in FIG. 18, the length is 16 bytes, and the content includes 4 bytes for the OXM header having: 2 bytes for the OFPMT_OXM=OFPMT_XM=1; 2 bytes for the length of the match fields payload, 0x0A; and 2 bytes for the OXM_Class, value 0xFFFF, experimenter class. The content of XID match class includes the following: 1 byte for the OXM_Field (and OXM_HASMASK bit), value either 0x7B (destination Exchange ID) or 0x7C (source Exchange ID); 1 byte for the length of the match payload, OXM_Length, value of 0x02; and 2 bytes for the Exchange Identifier, value in hexadecimal, 0x8b4f as an example. The match table in FIG. 18 also has 6 pad bytes not examined but required to make the structure a multiple of 8 bytes long.

Figure 19B:
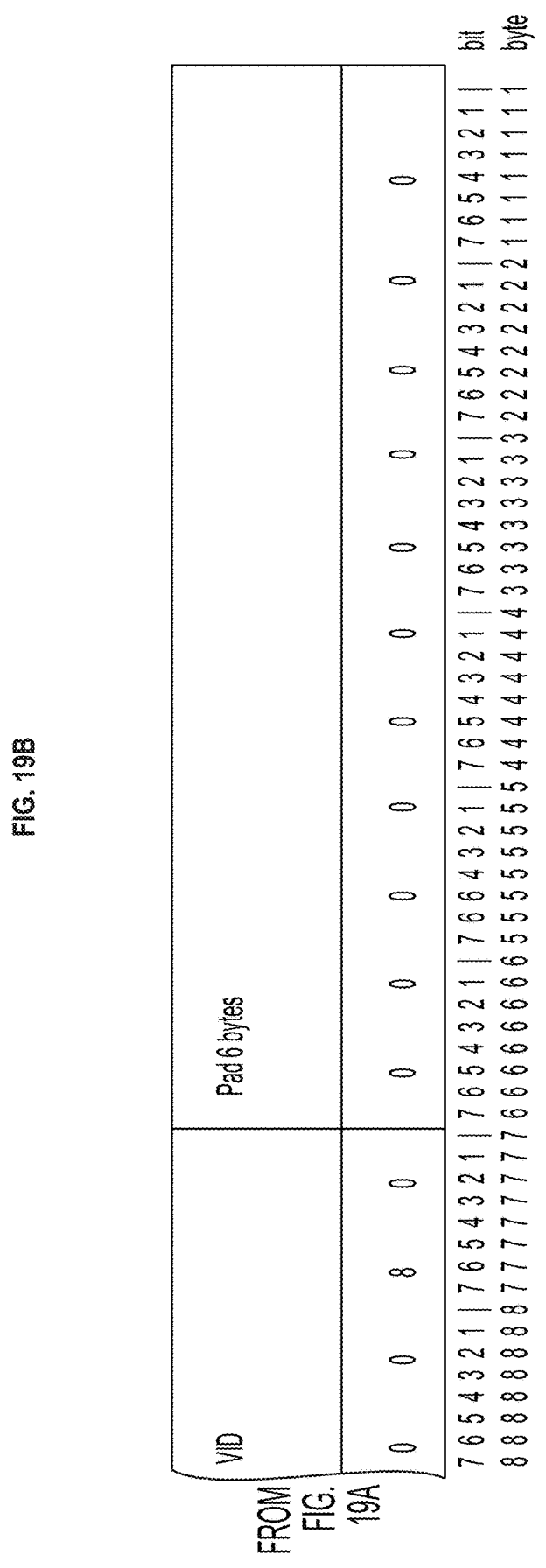

Regarding an example for SDN experimenter match classes for SAN VID (which includes VSAN ID and FID) for execution by the SAN switch 230 managed by SDN, a match table could have an entry for a OFPXMCF_SANSVID or OFPXMCF_SANDVID (SAN Source and Destination VSAN/FID, respectively), or both, according to one or more embodiments. Particularly, FIGS. 19A and 19B together depict an example match table with OpenFlow Extensible Match field OFPXMCF_SANSVID according to one or more embodiments. In the match table in FIGS. 19A and 19B, the length is 16 bytes, and the content includes 4 bytes for the OXM header which includes 2 bytes for the OFPMT_OXM=OFPMT_XM=1 and 2 bytes for the length of the match fields payload, 0x0A. As illustrated in FIGS. 19A and 19B, the match table includes the VID match class which include the following: 2 bytes for the OXM_Class, value 0xFFFF, experimenter class; 1 byte for the OXM_Field (and OXM_HASMASK bit), value either 0x7D (source VSAN/FID) or 0x7E (destination VSAN/FID); 1 byte for the length of the match payload, OXM_Length, value of 0x02; and 2 bytes for the VSAN/FID, value in hexadecimal, 0x0080 as an example. In FIGS. 19A and 19B, the match table also has 6 pad bytes not examined but required to make the structure a multiple of 8 bytes long.

Turning to an example for SDN experimenter match classes for SAN FICON Link Address for execution by the SAN switch 230 managed by SDN, FIG. 20 depicts an example match table having OpenFlow Extensible Match field OFPXMCF_SANSDID and _SANSPID according to one or more embodiments. The FICON Link Address is a combination of the Domain ID and the Port Address. Both the DID and PID are to be either for the destination (_SANDDID and _SANDPID combined) or the source (_SANSDID and _SANSPID combined). Rather than create a new match class, these can be combined as shown in FIG. 20 according to one or more embodiments. In the match table in FIG. 20, the length is 16 bytes, and the content includes 4 bytes for the OXM header which includes 2 bytes for the OFPMT_OXM=OFPMT_XM=1 and 2 bytes for the length of the match fields payload, 0x0E. The content of the match table in FIG. 20 includes the Domain ID match class having the following: 2 bytes for the OXM_Class, value 0xFFFF, experimenter class; 1 byte for the OXM_Field (and OXM_HASMASK bit), value either 0x73 (source Domain ID) or 0x74 (destination Domain ID); 1 byte for the length of the match payload, OXM_Length, value of 0x01; and 1 byte for the Domain ID, value in hexadecimal, 0x01 as an example. The content of the match table in FIG. 20 includes the Port ID match class having the following: 2 bytes for the OXM_Class, value 0xFFFF, experimenter class; 1 byte for the OXM_Field (and OXM_HASMASK bit), value either 0x75 (source Port ID) or 0x76 (destination Port ID); 1 byte for the length of the match payload, OXM_Length, value of 0x01; and 1 byte for the Port ID, value in hexadecimal, 0xC0 as an example. In FIG. 20, the match table also has 2 pad bytes not examined but required to make the structure a multiple of 8 bytes long.

Turning to an example for SDN experimenter match classes for SAN FCP 10-bit Link Address for execution by the SAN switch 230 managed by SDN, FIG. 21 depicts an example match table having OpenFlow Extensible Match field OFPXMCF_SANxPID and _SANxALA according to one or more embodiments. The FCP Link Address can take ports from the Arbitrated Loop Address field in order to have more than 256 link addresses in a SAN switch domain. Rather than create a new match class, the Port Address and Arbitrated Loop Address can be combined as shown in FIG. 21 according to one or more embodiments. Both the PID and ALA are to be either both for the destination or the source. In the match table in FIG. 21, the length is 16 bytes, and the content includes 4 bytes for the OXM header including 2 bytes for the OFPMT_OXM=OFPMT_XM=1 and 2 bytes for the length of the match fields payload, 0x0E. The match table in FIG. 21 includes the Port ID match class, the PORT ID match class including the following: 2 bytes for the OXM_Class, value 0xFFFF, experimenter class, 1 byte for the OXM_Field (and OXM_HASMASK bit), value either 0x75 (source Port ID) or 0x76 (destination Port ID); 1 byte for the length of the match payload, OXM_Length, value of 0x01; and 1 byte for the Port ID, value in hexadecimal, 0x01 as an example. The match table in FIG. 21 includes the Arbitrated Loop Address match class, the Arbitrated Loop Address match class including the following: 2 bytes for the OXM_Class, value 0xFFFF, experimenter class; 1 byte for the OXM_Field (and OXM_HASMASK bit), value either 0x77 (source Arbitrated Loop Address) or 0x78 (destination Arbitrated Loop Address); 1 byte for the length of the match payload, OXM_Length, value of 0x01; and 1 byte for the Domain ID, value in hexadecimal, 0xC0 as an example. In FIG. 21, the match table include also has 2 pad bytes not examined but required to make the structure a multiple of 8 bytes long.

Regarding an example for SDN experimenter match classes for SAN Domain and FCP 10-bit Link Address for execution by the SAN switch 230 managed by SDN, FIG. 22 depicts an example match table using OpenFlow Extensible Match field OFPXMCF_SANxDID, xPID, and xALA according to one or more embodiments. A full FCP link address with the domain ID and using 10-bit addressing would need the ALA field as well as the port address field. One or more embodiments can combine 3 match fields as shown in FIG. 22 according to one or more embodiments. All of the DID, PID and ALA are to be either for the destination or the source. In the match table in FIG. 22, the length is 16 bytes, and the content includes 4 bytes for the OXM header including 2 bytes for the OFPMT_OXM=OFPMT_XM=1 and 2 bytes for the length of the match fields payload, 0x13. The match table in FIG. 22 includes the Domain ID match class, the Domain ID match class including the following: 2 bytes for the OXM_Class, value 0xFFFF, experimenter class; 1 byte for the OXM_Field (and OXM_HASMASK bit), value either 0x73 (source Domain ID) or 0x74 (destination Domain ID); 1 byte for the length of the match payload, OXM_Length, value of 0x01; and 1 byte for the Domain ID, value in hexadecimal, 0x01 as an example. The match table in FIG. 22 includes the Port ID match class, the Port ID match class including the following: 2 bytes for the OXM_Class, value 0xFFFF, experimenter class; 1 byte for the OXM_Field (and OXM_HASMASK bit), value either 0x75 (source Port ID) or 0x76 (destination Port ID); 1 byte for the length of the match payload, OXM_Length, value of 0x01; and 1 byte for the Port ID, value in hexadecimal, 0xC0 as an example. The match table in FIG. 22 includes the Arbitrated Loop Address match class, the Arbitrated Loop Address match class including the following: 2 bytes for the OXM_Class, value 0xFFFF, experimenter class; 1 byte for the OXM_Field (and OXM_HASMASK bit), value either 0x77 (source Arbitrated Loop Address) or 0x78 (destination Arbitrated Loop Address); 1 byte for the length of the match payload, OXM_Length, value of 0x01; and 1 byte for the Domain ID, value in hexadecimal, 0x80 as an example. In FIG. 22, the match table includes 5 pad bytes not examined but required to make the structure a multiple of 8 bytes long.

Figure 23:
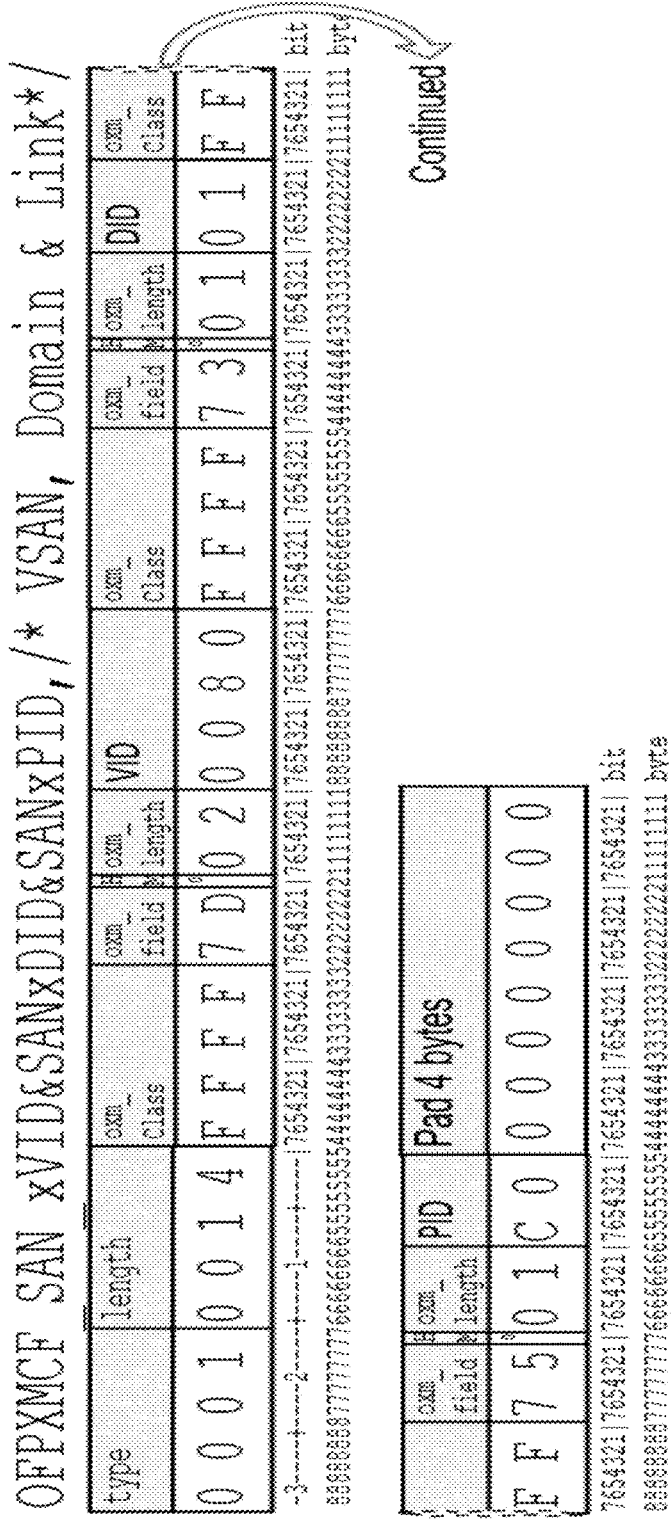
FIG. 23 depicts a block diagram of extensible match type experimenter fields for SAN virtual identification, SAN domain identification, and SAN port address identification in accordance with one or more embodiments of the present invention.

Turning to an example for SDN experimenter match classes for SAN VSAN/FID, Domain ID, and Link Address for execution by the SAN switch 230 managed by SDN, FIG. 23 depicts an example match table using OpenFlow Extensible Match field OFPXMCF_SANxVID, xDID, and xPID according to one or more embodiments. In Fibre Channel and FICON, physical SAN switches can be logically divided into subsets called a virtual SAN or a fabric, which has a numeric identifier. Ports in a physical switch can be placed in a VSAN or fabric. Cisco® designates this the Virtual SAN ID, or VSAN ID (or number); Broadcom/Brocade designates this the Fabric ID, or FID; and herein physical SAN switches logically divided into subsets called a virtual SAN or a fabric are designated as the virtual ID (VID) in order to represent and/or include the Virtual SAN ID (VSAN ID or number) as well as the Fabric ID (FID)). Currently, the VSAN/FID is a number from 0 to 256 which will fit in one byte, but to allow for expansion (as the analogous Ethernet VLAN ID had to be) it is two bytes herein according to one or more embodiments. Multiple physical switches can be connected with E Ports (expansion ports) or VE_Ports (Virtual Expansion ports using FCIP). Thus, a VID can span physical switches. Generally, all Fibre Channel communication between ports, and in the same zone if zoning is applied, is within the same VID. There are proprietary techniques to bypass that restriction, such as Fibre Channel Routing where the switches are actively aware of ports that extend beyond their VID, or "ignore VID" where the switches do not enforce that the ports must be in the same VID in order to communicate. Thus, a complete SAN ID is a combination of the VID, Domain ID, and the Port Address. The VID, DID, and PID are either for the destination (_SANDVID, _SANDDID, and _SANDPID combined), or the source (_SANSVID, _SANSDID, and _SANSPID combined). Rather than create a new match class, one or more embodiments can combine 3 match fields as shown in FIG. 23. All of the VID, DID, and PID are to be either for the destination or the source. According to one or more embodiments, the match table in FIG. 23 includes a length of 24 bytes, and the content includes 4 bytes for the OXM header including 2 bytes for the OFPMT_OXM=OFPMT_XM=1 and 2 bytes for the length of the match fields payload, 20 or 0x14. The match table in FIG. 23 includes the VSAN/Fabric ID match class, the VSAN/Fabric ID match class including the following: 2 bytes for the OXM_Class, value 0xFFFF, experimenter class; 1 byte for the OXM_Field (and OXM_HASMASK bit), value either 0x7D (source VID) or 0x7E (destination VID); 1 byte for the length of the match payload, OXM_Length, value of 0x01; and 2 bytes for the VID, value in hexadecimal, 0x0080 as an example. Also, the match table in FIG. 23 includes the Domain ID (DID) match class, the Domain ID (DID) match class including the following: 2 bytes for the OXM_Class, value 0xFFFF, experimenter class; 1 byte for the OXM_Field (and OXM_HASMASK bit), value either 0x73 (source Domain ID) or 0x74 (destination Domain ID); 1 byte for the length of the match payload, OXM_Length, value of 0x01; and 1 byte for the Domain ID, value in hexadecimal, 0x01 as an example. The match table in FIG. 23 includes the Port ID (PID) match class, the Port ID (PID) match class including the following: 2 bytes for the OXM_Class, value 0xFFFF, experimenter class; 1 byte for the OXM_Field (and OXM_HASMASK bit), value either 0x75 (source Port ID) or 0x76 (destination Port ID); 1 byte for the length of the match payload, OXM_Length, value of 0x01; and 1 byte for the Port ID, value in hexadecimal, 0xC0 as an example. In FIG. 22, the match table includes 7 pad bytes not examined but required to make the structure a multiple of 8 bytes long.

Figure 24:
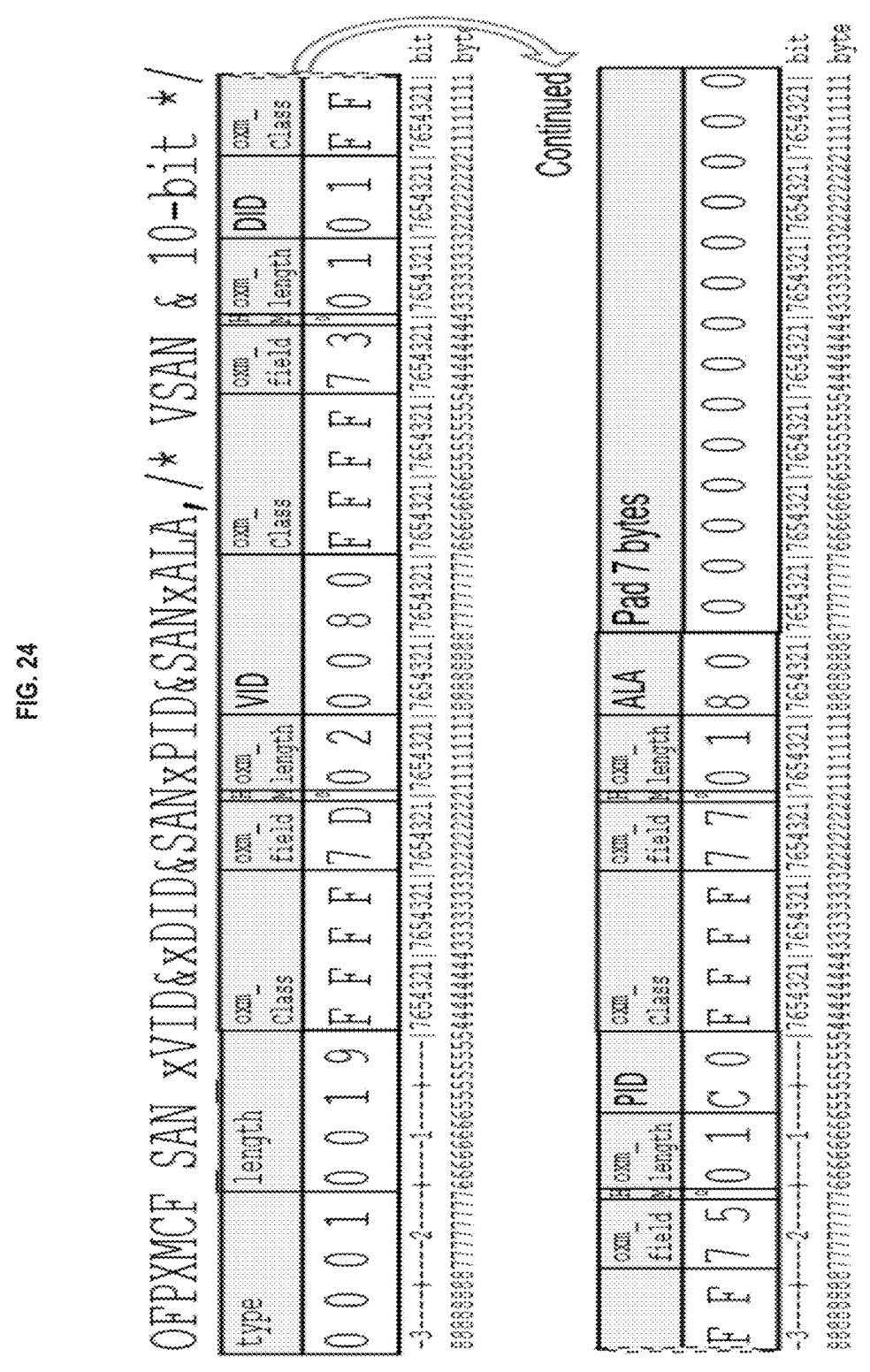

As another example combining FIGS. 22 and 23, FIG. 24 shows that a VID could also prefix a 10-bit link address like the SDN experimenter match classes for SAN Domain and FCP 10-bit Link Address discussed herein according to one or more embodiments. Particularly, FIG. 24 depicts an example match table using OpenFlow Extensible Match field OFPXMCF_SANxVID, xDID, xPID, and xALA according to one or more embodiments. According to one or more embodiments, the match table in FIG. 24 includes a length of 32 bytes, and the content includes 4 bytes for the OXM header which includes 2 bytes for the OFPMT_OXM=OFPMT_XM=1 and 2 bytes for the length of the match fields payload, 25 or 0x19. In the match table in FIG. 24, the content includes the VSAN/Fabric ID match class, the VSAN/Fabric ID match class including the flowing: 2 bytes for the OXM_Class, value 0xFFFF, experimenter class, 1 byte for the OXM_Field (and OXM_HAS-MASK bit), value either 0x7D (source VID) or 0x7E (destination VID); 1 byte for the length of the match payload, OXM_Length, value of 0x01; and 2 bytes for the VID, value in hexadecimal, 0x0080 as an example. In the match table in FIG. 24, the content includes the Domain ID (DID) match class, the Domain ID (DID) match class including the following: 2 bytes for the OXM_Class, value 0xFFFF, experimenter class; 1 byte for the OXM_Field (and OXM_HASMASK bit), value either 0x73 (source Domain ID) or 0x74 (destination Domain ID); 1 byte for the length of the match payload, OXM_Length, value of 0x01; and 1 byte for the Domain ID, value in hexadecimal, 0x01 as an example. In the match table in FIG. 24, the content includes the Port ID (PID) match class, the Port ID (PID) match class including the following: 2 bytes for the OXM_Class, value 0xFFFF, experimenter class; 1 byte for the OXM_Field (and OXM_HASMASK bit), value either 0x75 (source Port ID) or 0x76 (destination Port ID); 1 byte for the length of the match payload, OXM_Length, value of 0x01; and 1 byte for the Port ID, value in hexadecimal, 0C0 as an example. Also, in the match table in FIG. 24, the content includes the Arbitrated Loop Address (ALA) match class, the Arbitrated Loop Address (ALA) match class including the following: 2 bytes for the OXM_Class, value 0xFFFF, experimenter class; 1 byte for the OXM_Field (and OXM_HASMASK bit), value either 0x77 (source Arbitrated Loop Address) or 0x78 (destination Arbitrated Loop Address); 1 byte for the length of the match payload, OXM_Length, value of 0x01; and 1 byte for the Domain ID, value in hexadecimal, 0x80 as an example. In FIG. 24, the match table includes 4 pad bytes not examined but required to make the structure a multiple of 8 bytes long.

According to one or more embodiments, example structures (which can be generated by SDN controllers (e.g., one or more endpoint devices 210 as the SDN controller) have been defined as match tables including experimenter fields constructed as discussed herein to be parsed, matched to incoming traffic (which can be frames, packets, etc.) from various types of endpoint devices, and routed by the SAN switches 230 managed by SDN and/or SDN architecture to the appropriate end device, another SAN switches 230 managed by SDN, etc. By using the experimenter match field generated by SDN controllers (e.g., one or more endpoint devices 210 as the SDN controller) as discussed herein, SAN-specific addressable items such as WWPNs, SAN port address, FID (Fabric ID), and PID (switch ID) are utilized in SDN rules to control SAN traffic by SAN switches 230 managed by SDN according to one or more embodiments. Managing SAN traffic (and optionally TCP/IP traffic i.e. LAN traffic) using SAN switches 230 managed by SDN according to one or more embodiments is different and improved over any SDN switch that is only for TCP/IP networks (i.e., IP address, port, VLAN ID, MAC address). As discussed herein, SAN switches 230 can manage SAN traffic using SDN as well as TCP/IP traffic using SDN. SDN virtualizes existing Internet Protocol (IP) networks, allows flexible and rapid response to a variety of requirements, allows network engineers to simplify, automate network management, use open protocols, reduce cost, and innovate. Traditional control of TCP/IP networks is performed by highly-skilled experts who need a lot of training and experience. They tend to specialize, to the point where one vendor has a series of certifications, but they might be useless in a different network environment. The customers tend to be locked in by a network infrastructure provider, because of lack of inter-operability and the expense of two types of experts. The customers (or other vendors or academia) cannot innovate because the vendor's products are proprietary and (usually) non-extendable. Also, one vendor has multiple network types, applied to two different infrastructure models. All of these reasons make it difficult to simplify and automate. It should be appreciated that SDN switches (modified as discussed herein) are immensely cheaper and easier to manage and are interoperable using the techniques disclosed in one or more embodiments. Further, according to one or more embodiments, a LAN SDN switch could be extended to be a SAN SDN switch 230 thereby routing SAN traffic and TCP/IP traffic. Traffic forwarding is the main purpose of the data (or forwarding) plane, and both LANs and SANs are preoccupied with that (e.g. special circuits for that function). However, they have different flow controls and while LAN firewalls have ACLs (Access Control Lists), zoning is used in SANs. LANs are preoccupied with routing and have many routing protocols with many administration techniques; SANs have much less so (although it is important) and have only one routing technique that is (relatively) difficult to administer. One or more embodiments provide the ability to implement even more routing techniques, some of which might be better for LANs, some for SANs, and/or some for combined SAN over LAN (i.e. FCIP). All the routing techniques could be administered from a single controller (e.g. SDN controller of an endpoint device 210) for simplification (i.e., no need to manage each SDN SAN switch 230 separately thereby reducing labor and the possibility for errors).

III. Software Defined Networking Managed Storage Area Network Examples

In accordance with one or more embodiments, this section illustrates examples to demonstrate that traditional SAN routing/functions can be implemented with SDN-style matching/forwarding tables using SAN switches 230 managed by SDN and/or SDN architecture, while using the modified match tables discussed herein. The various examples are for ease of understanding and illustration purposes and are not meant to be limiting. In various examples, the SDN controller (e.g., one or more endpoint devices 210 configured as the SDN controller) having an SDN architecture is configured to generate match tables having the SDN architecture and download the match tables to SDN managed SAN switches 230 according to one or more embodiments. The SAN switches 230 managed using SDN are configured to read incoming frames from source endpoint devices 210 and route traffic to destination endpoint devices 210 over the SAN 200 using the downloaded match tables according to one or more embodiments. Various examples provide illustrations of how the modified match tables are used in the SAN 200 by SDN managed SAN switches 230 to route traffic according to one or more embodiments. In the examples in FIGS. 25, 27, 29, 31, 33A, 33B, 33C, 35A, 35B, 35C, 37A, and 37B, the experimenter field of the extended field of the match table is depicted, and match tables are abbreviated for conciseness such that the header information is not shown. In the modified match tables, the source (S) and destination (D) entries for many types of routing are shown, and the match table has an asterisk "*" for any entry that is not utilized by the SAN switch 230 in SAN 200. The action entry in the match table denotes that action to be taken by SDN managed SAN switches 230.

FIGS. 26, 28, 30, 32, 34, 36, 38, and 39 illustrate various commands that may be executed by the SDN managed SAN switches 230 to perform the routing in the match tables according to one or more embodiments. For explanation purposes and not limitation, these commands are illustrated in Ubuntu syntax. Ubuntu is an open source version of the Linux® operating system. Ubuntu has virtualized network switches and routers and has commands that manage them with "ovs" (open virtual switch) commands to manage normal Layer 2 (Ethernet and VLAN) and Layer 3 (IP routing) functions. Ubuntu implemented OpenFlow protocols with ovs-ofctl commands (for open virtual switch via OpenFlow control). There are other OpenFlow control products with different commands and graphical interfaces that simplify and enhance the management of OpenFlow-compliant networks. For illustration purposes and not limitation, the ovs-ofctl commands are utilized as examples according to one or more embodiments.

Figure 25:
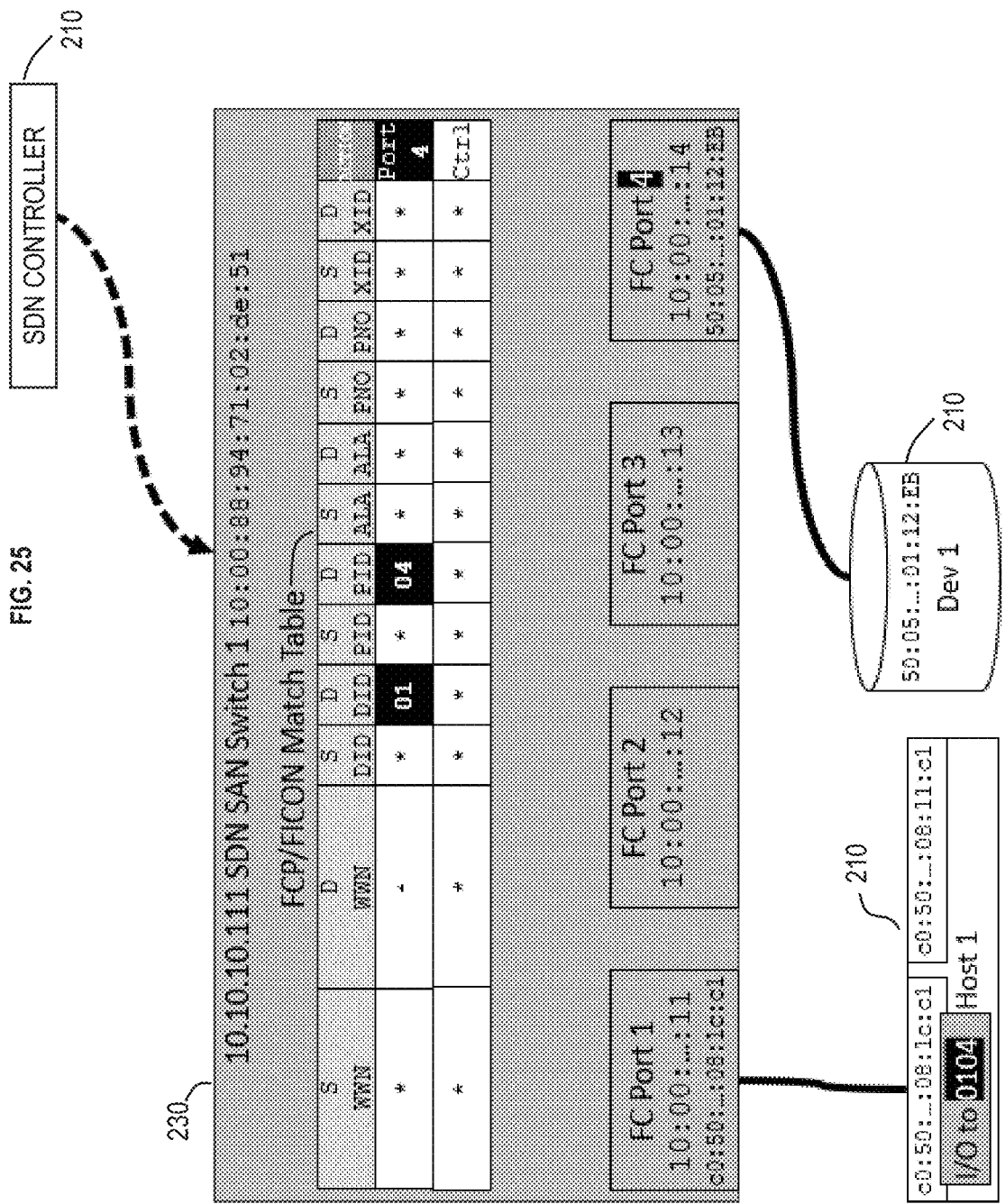
FIG. 25 depicts a block diagram of an SDN-managed SAN switch with domain identification and port address identification to port in accordance with one or more embodiments of the present invention.

Now turning to an example for FICON destination Domain ID and Port ID, FIG. 25 depicts an SDN-managed SAN switch 230 that routes DID/PID to port according to one or more embodiments. FICON I/O frames (shown in FIG. 3B) send destination Domain and Port address from Host 1 (e.g., endpoint device 210), so the SDN-controlled SAN switch 230 can match these frame fields in the match table and send to the correct port. Particularly, FIG. 25 illustrates an example of a FICON Host (e.g., endpoint device 210) sending and I/O frame to 0104, which is switch domain 01, port address 04 to SAN switch 230. By processing via SAN switch 230, the match table for DDID=01 and DPID=04 is used to send the frame to fiber channel (FC) port 4. The SAN switch 230 is managed and executed using SDN architecture and relies on a modified match table using SDN architecture according to one or more embodiments. The SDN controller as endpoint device 210 in FIG. 25 can execute the commands depicted in FIG. 26 and direct SDN SAN switch 230 to update its match tables according to one or more embodiments. FIG. 26 depicts example commands executed by the SDN controller as endpoint device 210 to direct SDN SAN switch 230 to send SAN traffic for a Domain ID/Port Address to a port according to one or more embodiments. In FIG. 26, Ubuntu commands instruct the OpenFlow switch (i.e., SAN switch 230 managed by SDN)

at IP address 10.10.10.111 to route all traffic destined for domain ID 01 and port address 04 to port FC4. As can be seen in FIGS. 25 and 26, SDN controller (e.g., endpoint device 210) will create match table entries that are used by the SDN SAN switch 230, and the match table entries enable SDN executing on the SAN switch 230 to send FICON frames to the desired destination port, according to one or more embodiments.

Figure 27:
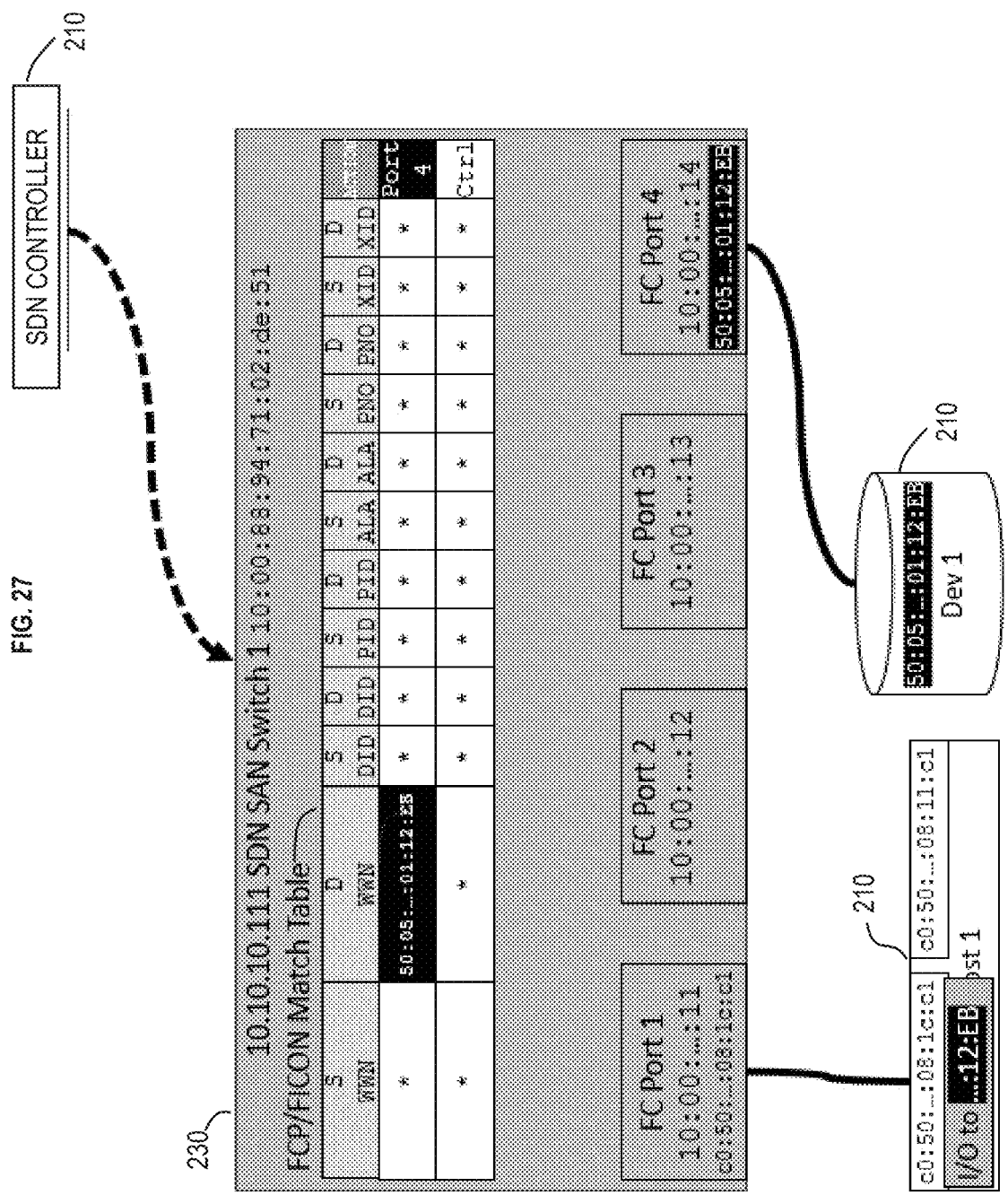
FIG. 27 depicts a block diagram of an SDN-managed SAN switch with world-wide name to port in accordance with one or more embodiments of the present invention.

Turning to an example for FCP WWN to port, FIG. 27 depicts an SDN-managed SAN switch 230 that routes WWN to port according to one or more embodiments. For FCP, a name server is to have the correlation of WWN to Port. This name server could be implemented as a function of the base SAN switch (recall "normal switch function" of stages 405 and 507 is an option for the action of a match table entry), or as a Virtual Service on the SDN SAN Switch, SDN controller, or another accessible server, or by observing the PLOGI (Physical Login) frames that are sent during the FCP Link Initialization standard process. FIG. 27 illustrates an FCP host (e.g., endpoint device 210) sending (e.g., a frame) containing a destination WWN. The SDN switch 230 can obtain this information from the incoming frame and the SDN controller (e.g., endpoint device 210) that provides the match table, and the SDN switch 230 adds a match table entry in the match table for the port that has that WWN. The SDN controller as endpoint device 210 in FIG. 27 can execute the commands depicted in FIG. 28 and direct the SDN SAN switch 230 to create match table entries according to one or more embodiments. FIG. 28 depicts example commands that result in the FCP/FICON match table entries shown in the SAN switch 230 to send SAN traffic for a WWN to a port according to one or more embodiments. In FIG. 28, Ubuntu commands instruct the OpenFlow switch (i.e., SAN switch managed by SDN) at IP address 10.10.10.111 to route all traffic destined for WWN 10:00: c4:f5:7c:1d:25:a0 to port FC4. As can be seen in FIGS. 27 and 28, SDN controller (e.g., endpoint device 210) is configured to create match table entries that are stored and used by the SAN switch 230, and the match table entries enable SDN executing on the SAN switch 230 to correlate WWNs to ports according to one or more embodiments.

Figure 29:
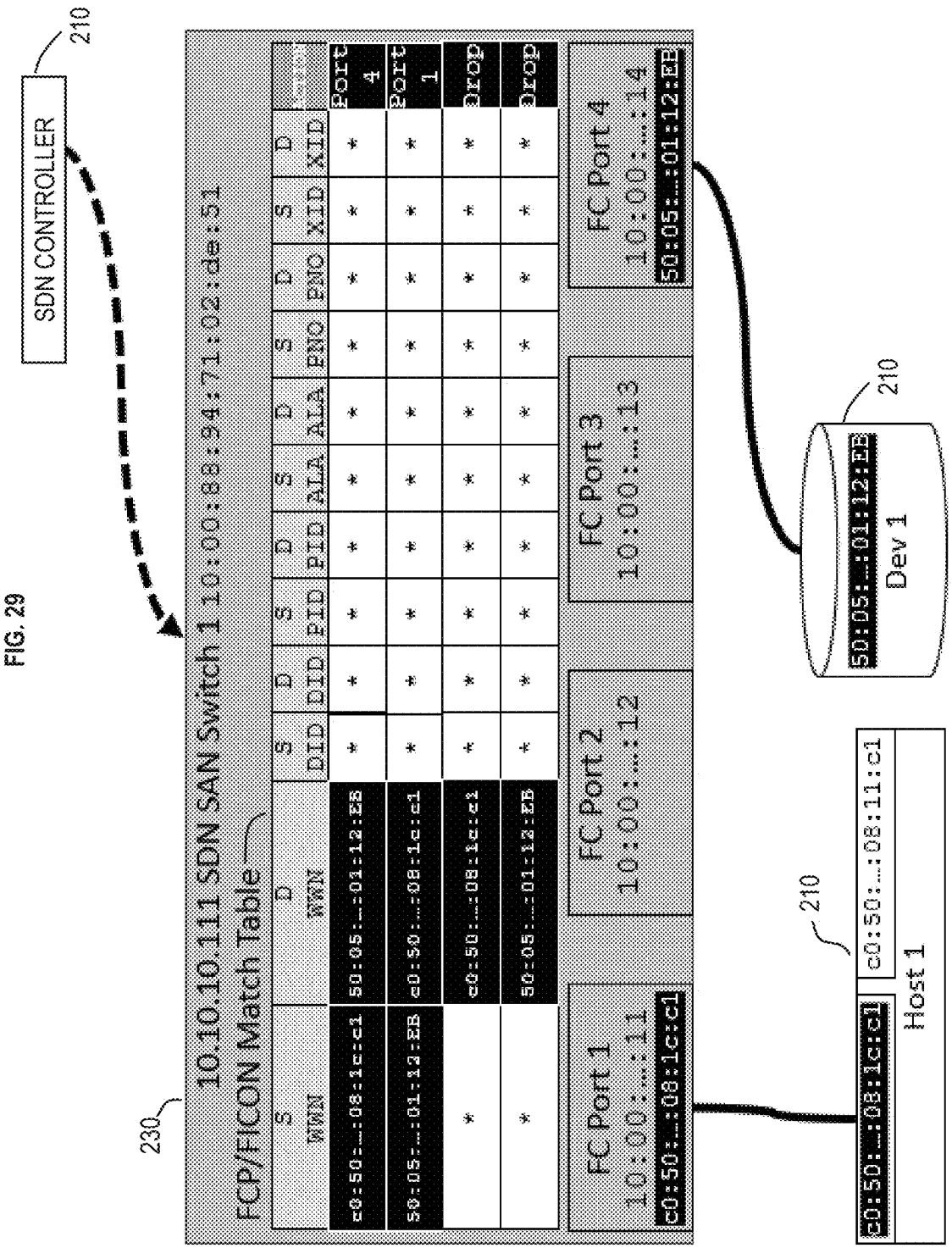
FIG. 29 depicts a block diagram of an SDN-managed SAN switch to implement zoning by world-wide name in accordance with one or more embodiments of the present invention.

Regarding an example for FCP Zoning by WWN, FIG. 29 depicts an SDN-managed SAN switch 230 that routes to a Zone by WWN according to one or more embodiments. FCP requires zones. One method of zoning is with WWNs. In the match table and as executed by SAN switch 230, FIG. 29 illustrates match table entries that allow 2 ports to communicate based on WWN, in the first 2 rows, and drops any frames destined for these ports from any other port, as shown in the last 2 rows. The SAN switch 230 in FIG. 29 can execute the commands depicted in FIG. 30 according to one or more embodiments. FIG. 29 depicts example commands executed by the SAN switch 230 to implement a SAN zone using WWNs according to one or more embodiments. In FIG. 30, Ubuntu commands instruct the OpenFlow switch (i.e., SAN switch 230 managed by SDN) at IP address 10.10.10.111 to allow traffic between the host's WWN (e.g., Host 1 as endpoint device 210) and the device's WWN (e.g., device 1 as another endpoint device 210) and drop traffic for those destinations from any other WWN. Since higher priority values take precedence, the flows with matching source and destination are used before the "drop traffic to wwn_dst" flow is used, so that the zone allows traffic between ports and does not drop it.

It is noted that group tables (discussed herein), added in OpenFlow v1.1 but not shown in this example, could consolidate many rows, so a large zone would not need $$\frac{n(n-1)}{2}$$

rows for n ports in a zone in one or more embodiments. Likewise, the "conjunction" parameter, also not shown in this example, would allow multiple ports to be in a zone and simplify the table entries, with 1 row per destination port. As can be seen in FIGS. 29 and 30, SDN controller (e.g., endpoint device 210) is configured to create match table entries that are executed by the SAN switch 230, and the match table entries enable SDN executing on the SAN switch 230 to perform WWN zoning according to one or more embodiments. It should be appreciated that SDN zoning according to one or more embodiments is much simpler and more efficient compared to proprietary zoning in a SAN switch.

Figure 31:
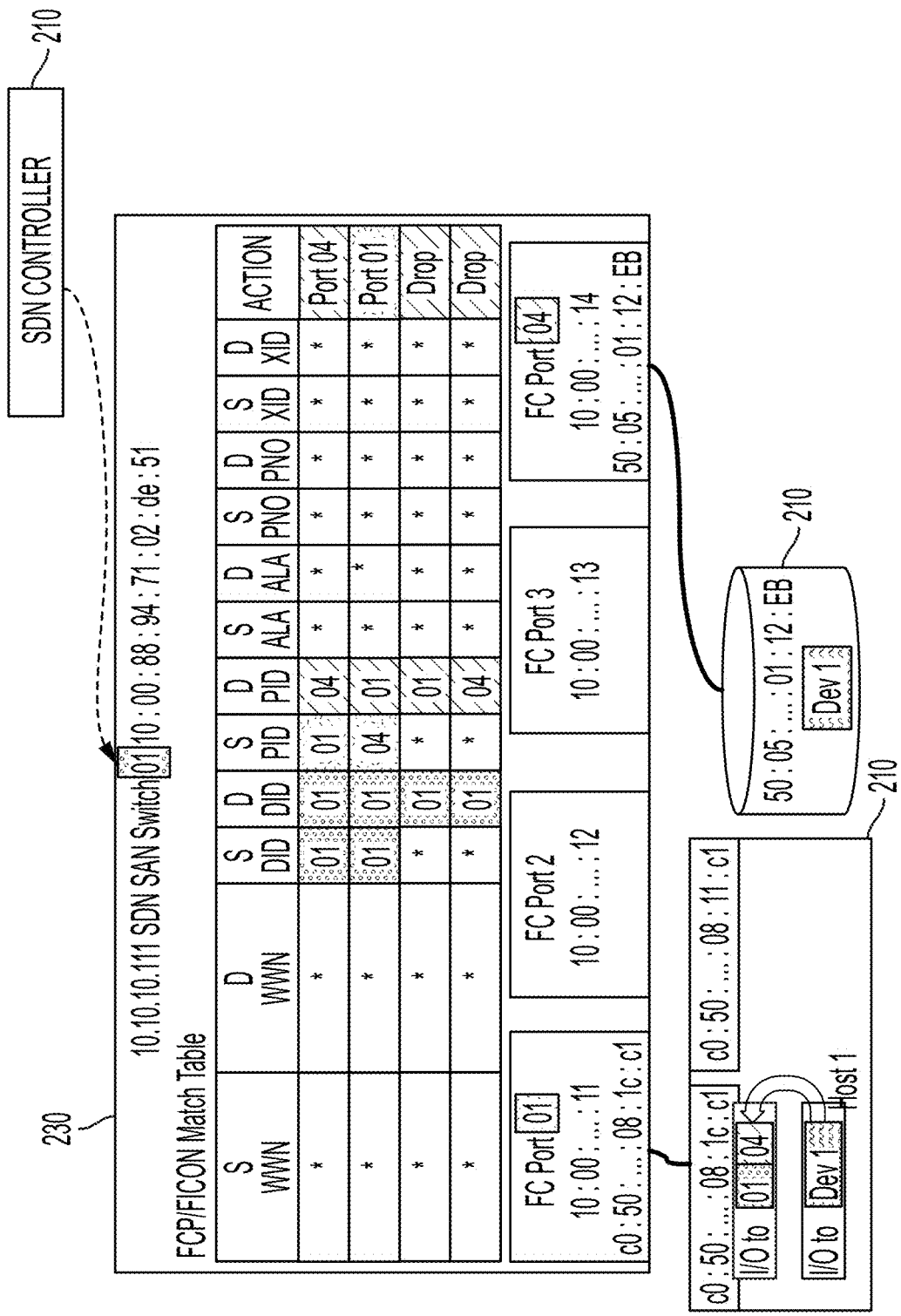
FIG. 31 depicts a block diagram of an SDN-managed SAN switch to implement zoning by domain name identification and port address identification in accordance with one or more embodiments of the present invention.

Turning to an example for FCP Zoning by Domain ID and Port Address, FIG. 31 depicts an SDN-managed SAN switch 230 that routes to a Zone by Domain ID and Port Address according to one or more embodiments. Zones can also use Domain ID (DID) and Port Address ID (PID). In the match table executed by SAN switch 230, FIG. 31 illustrates example match table entries that allow 2 ports to communicate based on Domain ID and Port Address ID, in the first 2 rows, and drops any frames destined for these ports from any other port, as shown in the last 2 rows. FIG. 32 depicts example commands executed by the SAN switch 230 to implement a SAN zone using Domain ID and Port Address ID according to one or more embodiments. According to one or more embodiments, it is noted that a zone can be made from a combination of matches for WWNs and Domain ID and Port Address, which is also required in current SAN zones. As can be seen in FIGS. 31 and 32, SDN controller (e.g., endpoint device 210) is configured to create match table entries that are executed by the SAN switch 230, and the match table entries enable SDN executing on the SAN switch 230 to perform Domain ID and Port Address zoning according to one or more embodiments. Thus, if an I/O operation from a host (e.g., as an endpoint device 210) with a channel attached to FC Port 1 on Switch 1 is destined for device Dev1 (e.g., another endpoint device 210) with destination address 0104, meaning domain ID 0x01 and port 0x04, SDN switch 1 (SDN SAN switch 230) examines the incoming FC frame, finds a match with source domain ID=0x01, destination domain ID=0x01, source port ID=0x01 and destination port ID=0x04, and finds the action is to forward the frame to FC port 04. Similarly, the device response (from 0104 to 0101) has a match that is forwarded to FC port 01. Any other traffic destined for port 0104 or 0101 is dropped. As noted above, it should be appreciated that SDN zoning according to one or more embodiments is much more concise and more efficient compared to proprietary zoning in a SAN switch.

Figure 33B:
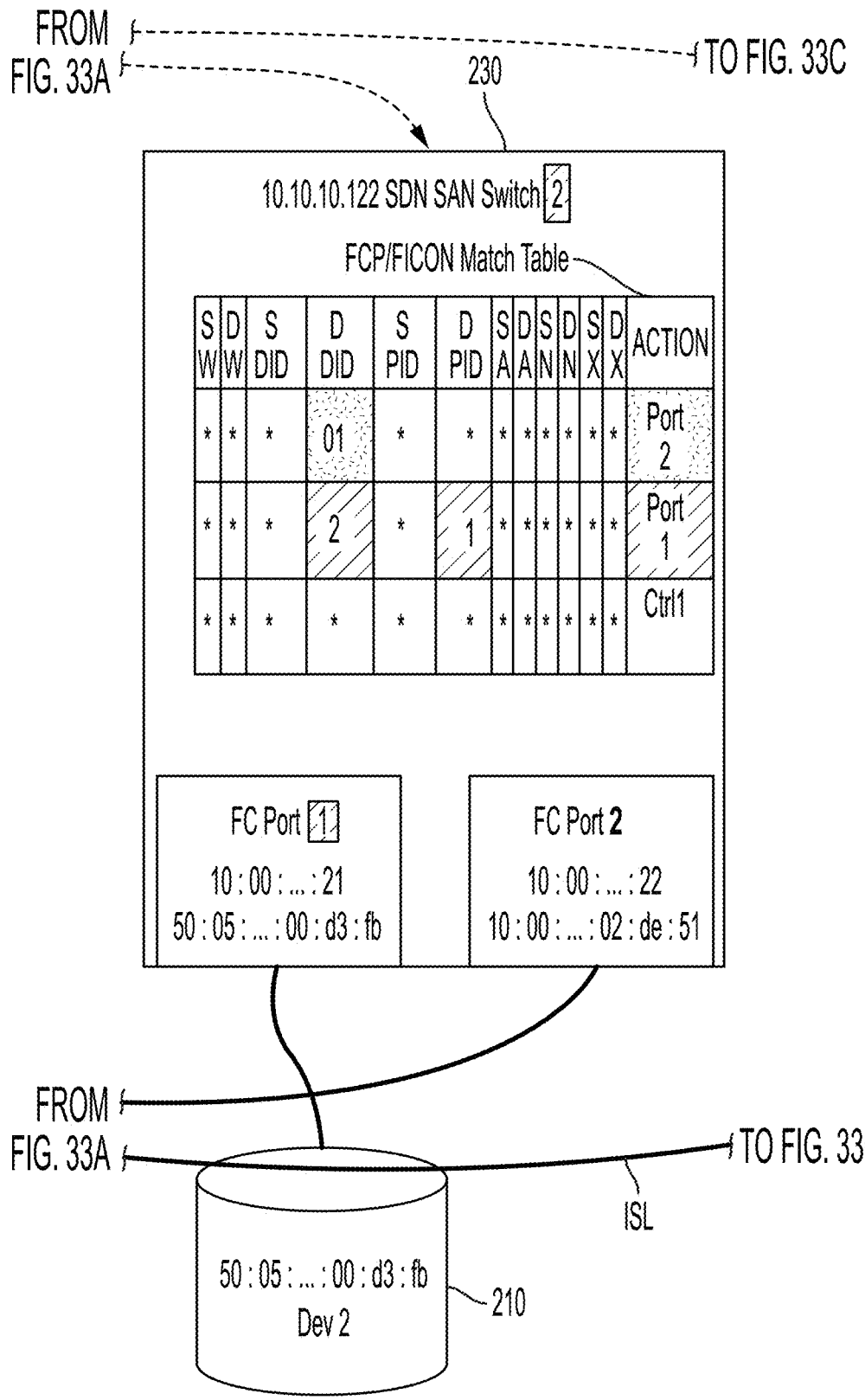
FIG. 33B depicts the block diagram of the SDN-managed SAN switch to implement inter-switch link selection, as a continuation of FIG. 33A, in accordance with one or more embodiments of the present invention.
Figure 33C:
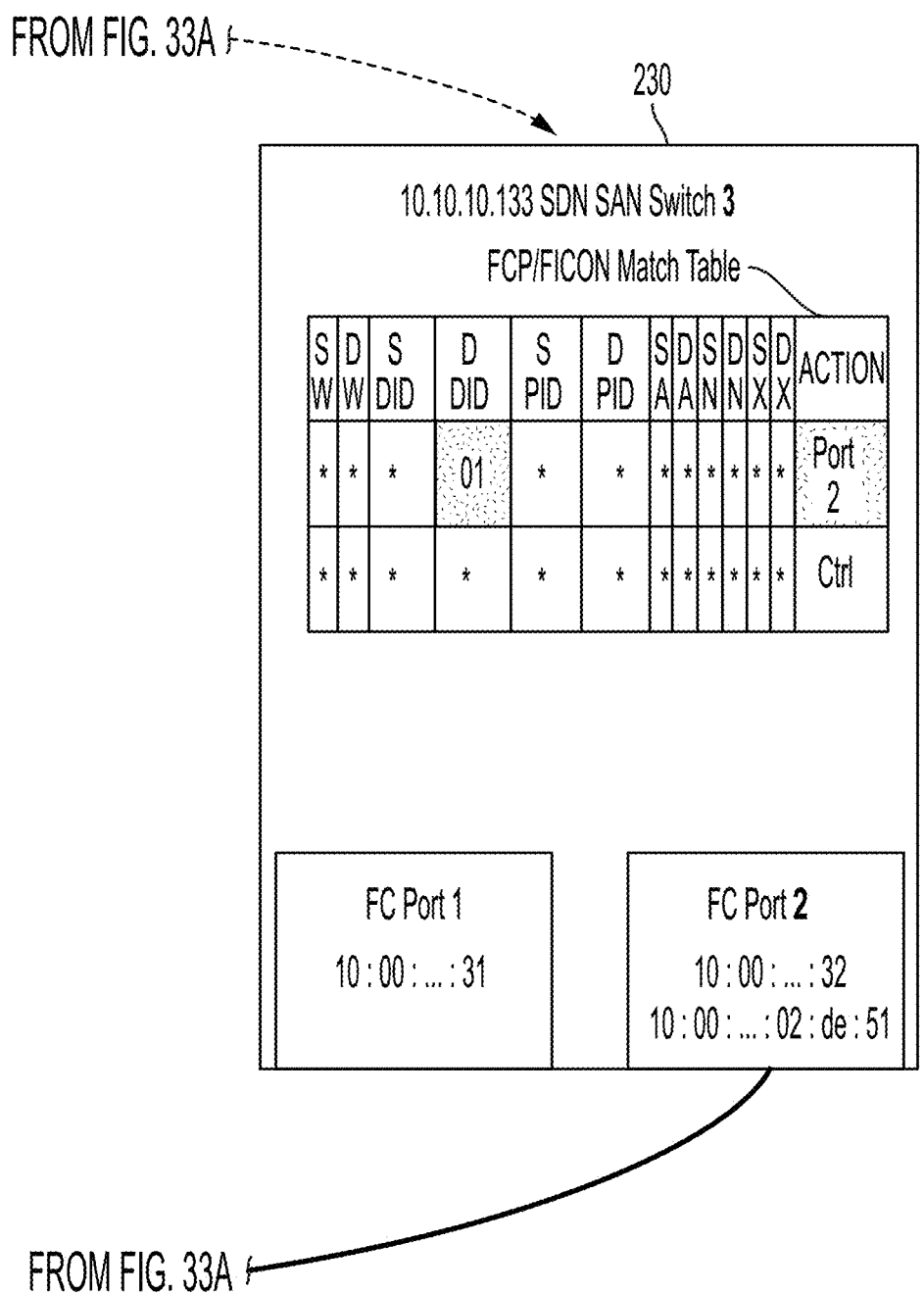
FIG. 33C depicts the block diagram of the SDN-managed SAN switch to implement inter-switch link selection, as a continuation of FIGS. 33A and 33B, in accordance with one or more embodiments of the present invention.

Regarding an example for Interswitch Link (ISL) Selection, FIGS. 33A, 33B, and 33C together depict SDN-managed SAN switches 230 that route according to an ISL selection according to one or more embodiments. Interswitch links (ISLs) connect SAN switches 230 in SAN 200. FSPF (Fabric Shortest Path First) is used to determine routes between switches in a fabric, which would choose 1 or more ISLs as the egress port. In the match table and executed by SAN switches 230, FIGS. 33A, 33B, and 33C illustrate example match table entries that send all traffic with a non-local Domain ID to an ISL port according to one or more embodiments. FIG. 34 depicts example commands executed by the SAN switch 230 to implement InterSwitch Link (ISL) routing according to one or more embodiments. In FIG. 34, execution of the commands performing the following: instruct the OpenFlow switch (e.g., Switch 1 as SAN switch 230 managed by SDN) at IP address 10.10.10.111 to send all traffic destined for Domain ID 02 to port FC3, and for Domain ID 03 to port FC2; instruct the OpenFlow switch (i.e., Switch 2 as SAN switch 230 managed by SDN) at IP address 10.10.10.122 to send all traffic destined for Domain ID 01 to port FC2; and instruct the OpenFlow switch (Switch 3 as SAN switch 230 managed by SDN) at IP address 10.10.10.133 to send all traffic destined for Domain ID 01 to port FC2. As can be seen in FIGS. 33A, 33B, 33C, and 34, SDN controller (e.g., endpoint device 210) is configured to create match table entries that are executed by the SAN switches 230 (e.g., switches 1, 2, 3), and the match table entries enable SDN executing on the SAN switches 230 to perform inter switch routing over ISLs according to one or more embodiments. Thus, if an I/O operation from a host (e.g., as an endpoint device 210) with a channel attached to FC Port 1 on Switch 1 is destined for 0201, meaning domain ID 0x02 and port 0x01, SDN Switch 1 (SDN SAN switch 230) examines the incoming FC frame, finds a match with destination domain ID=0x02 and forwards the frame to FC port 3. SDN switch 2 examines the incoming frame, finds a match with destination port ID=0x01 and forwards the frame to FC port 1. Groups, such as ISL trunks, can be handled in versions of OpenFlow (after v1.2). Although not discussed in this example, it should be appreciated that groups (e.g., ISL trunks) can be utilized in one or more embodiments.

Figure 35A:
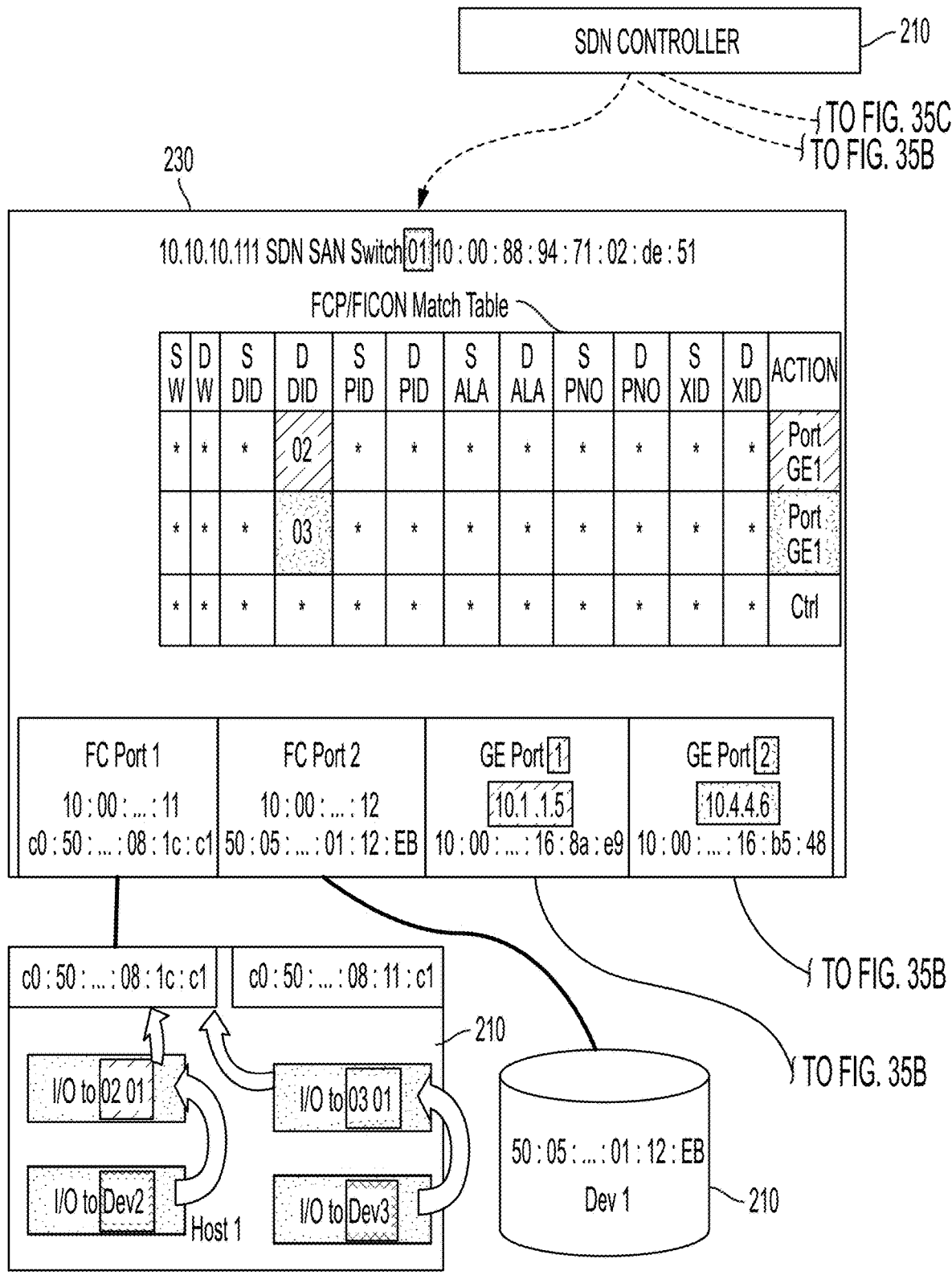
FIG. 35A depicts a block diagram of an SDN-managed SAN switch to implement fiber channel over Internet protocol tunnel selection in accordance with one or more embodiments of the present invention.
Figure 35B:
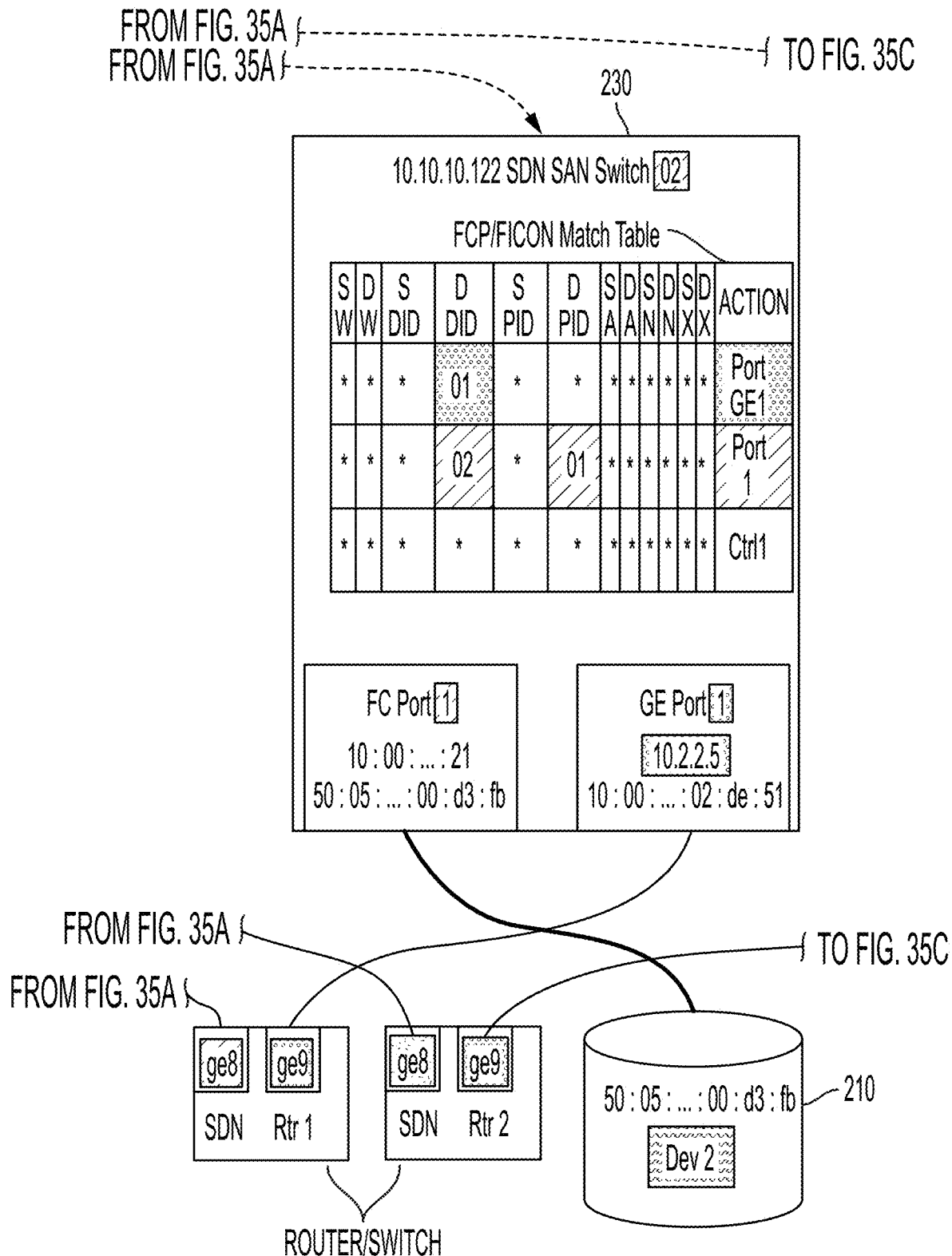
FIG. 35B depicts the block diagram of the SDN-managed SAN switch to implement fiber channel over Internet protocol tunnel selection, as a continuation of FIG. 35A, in accordance with one or more embodiments of the present invention.

Turning to an example for FCIP Tunnel Selection, FIGS. 35A, 35B, and 35C together depict SDN-managed SAN switches 230 that route an FCIP tunnel according to one or more embodiments. If a connection to another switch in a SAN fabric is through an FCIP link (e.g., a VE_Port or Virtual Expansion port), there has to be a correlation of a GE (gigabit Ethernet) port to a Domain ID, in order to emulate a VE_Port. In the match table and executed by SAN switches 230, FIGS. 35A, 35B, and 35C illustrate match table entries that send all traffic destined for a remote Domain ID to a GE port. FIG. 36 depicts example commands executed by the SAN switches 230 in FIGS. 35A, 35B, and 35C to implement FCIP routing according to one or more embodiments. FIG. 36 illustrates example commands that perform the following: instruct the OpenFlow switch (i.e., Switch 01 as SAN switch 230 managed by SDN) at IP address 10.10.10.111 to send all traffic destined for Domain ID 02 to port GE1, and destined for Domain ID 03 to port GE2; instruct the OpenFlow switch (i.e., Switch 02 as SAN switch 230 managed by SDN) at IP address 10.10.10.122 to send all traffic destined for Domain ID 01 to port GE1; and instruct the OpenFlow switch (i.e., Switch 03 as SAN switch 230 managed by SDN) at IP address 10.10.10.133 to send all traffic destined for Domain ID 01 to port GE1. As can be seen in FIGS. 35A, 35B, 35C, and 36, SDN controller (e.g., endpoint device 210) is configured to create match table entries that are executed by the SAN switches 230, and the match table entries enable SDN executing on the SAN switches 230 to perform inter switch routing using FCIP links according to one or more embodiments. Also, it is noted how the commands to create an FCIP link in FIGS. 35A, 35B, and 35C and 36 are concise and similar to the commands that set up ISLs in FIGS. 33A, 33B, 33C, and 34 according to one or more embodiments, which are both similar to the commands used to set up L2 bridges and L3 routes. Further, it is noted that commands for FCIP tunnels in one or more embodiments are more concise and efficient compared to a proprietary FCIP tunnel configuration.

Figure 37A:
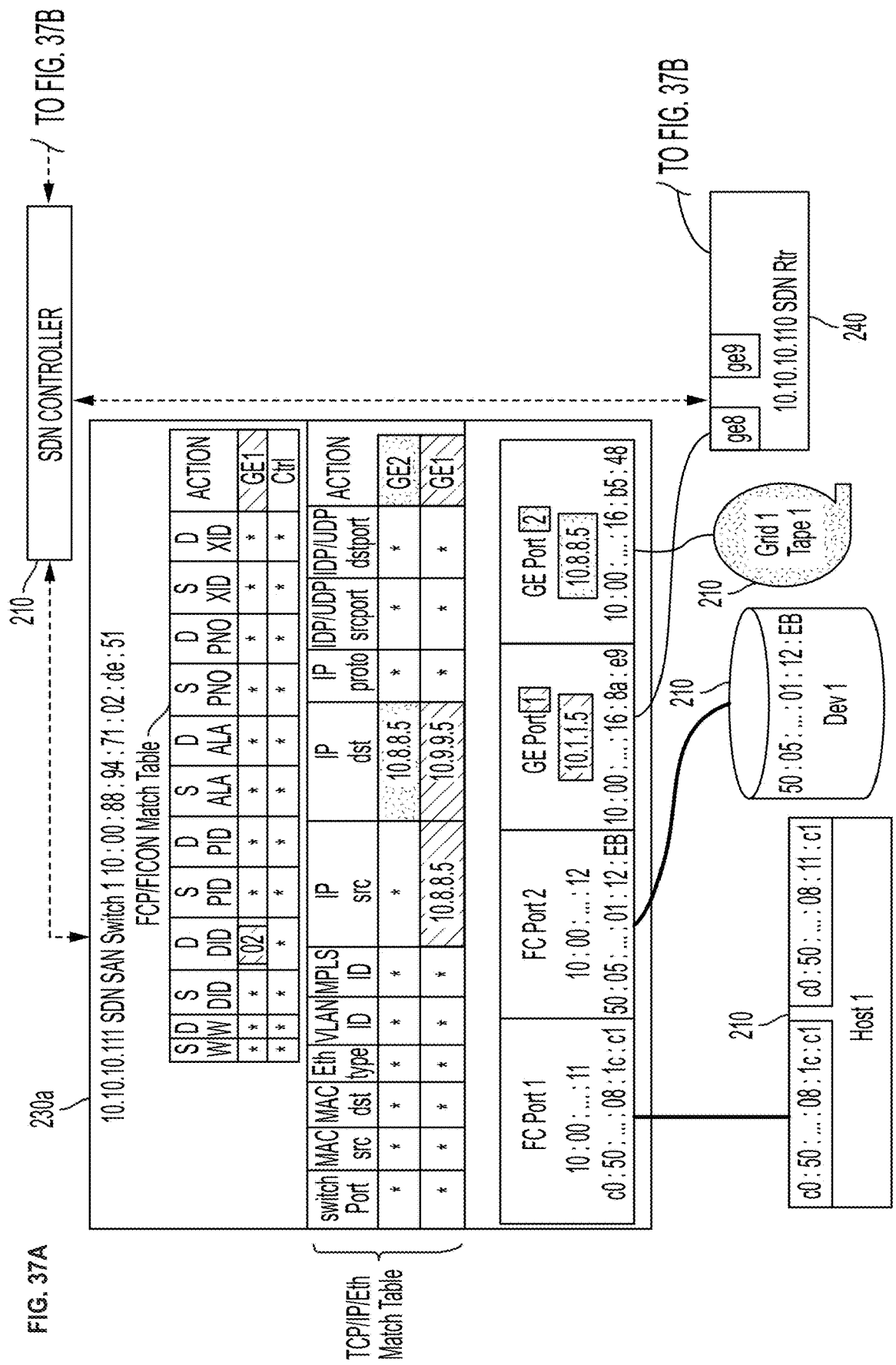
FIG. 37A depicts a block diagram of an SDN-managed SAN switch to implement fiber channel over Internet protocol tunnel for Internet protocol extension communication in accordance with one or more embodiments of the present invention.
Figure 37B:
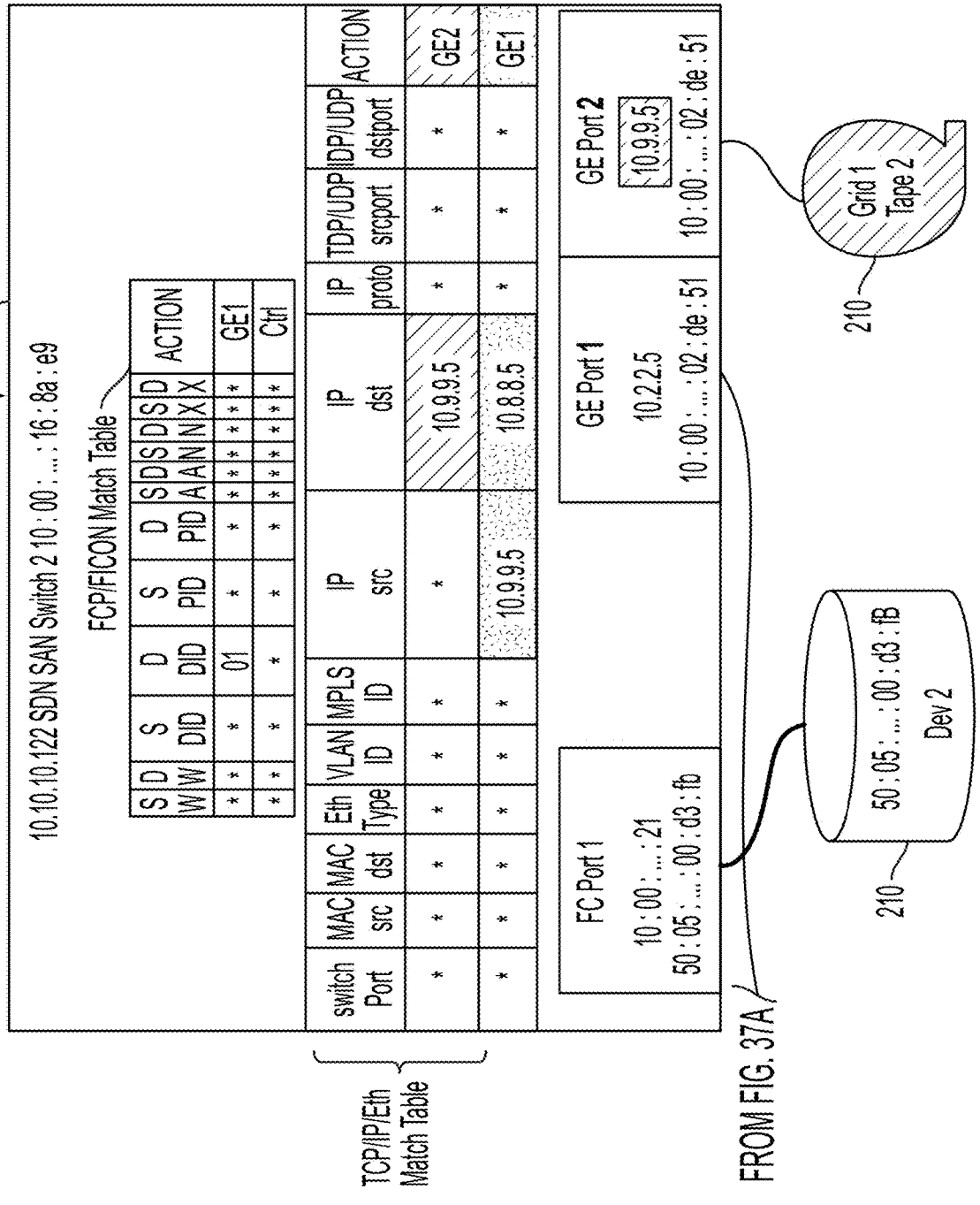
FIG. 37B depicts the block diagram of the SDN-managed SAN switch to implement fiber channel over Internet protocol tunnel for Internet protocol extension communication, as a continuation of FIG. 37A, in accordance with one or more embodiments of the present invention.

Regarding an example for IPEX Path Selection (TCL), FIGS. 37A and 37B together depict 2 SDN-managed SAN and LAN switches 230 (which are illustrated as 230a and 230b) and 1 SDN-managed LAN switch 240 that route IPEX TCL according to one or more embodiments. In the current state of the art, Traffic Control Lists (TCLs) are required to select paths for IPEX communication. Using match tables and executed by SDN SAN switches 230, FIGS. 37A and 37B illustrate example match table entries that send traffic destined for an IP address to an ISL (not shown) or FCIP link, through normal SDN match table entries used to manage TCP/IP/Ethernet flows, according to one or more embodiments. FIG. 38 depicts example commands executed by the SAN switch 230a to implement FCIP routing according to one or more embodiments. Particularly, FIG. 38 depicts example commands executed by the SAN switches 230a in FIGS. 37A and 37B to implement OpenFlow commands to set up a Brocade® SAN FCIP/IPEX tunnel according to one or more embodiments. FIG. 38 illustrates example Ubuntu commands that instruct Switch 1 as SAN switch 230a (e.g. at IP address 10.10.10.111) to have an FCIP tunnel with IPEX. GE port 1 is assigned the IP address 10.1.1.5 and is attached to SDN switch 240 with IP address 10.10.10.110, which has a route to 10.2.2.5, supplied by the SDN controller (e.g., as one of the endpoint devices 210) with instructions in FIG. 39. Where in current state-of-the-art SAN, an FCIP Tunnel 24 and circuit 0 must be defined to create a socket between 10.1.1.5 and 10.2.2.5, but an SDN SAN switch 230 can create the same flow with instruction 3802 in FIG. 38 according to one or more embodiments. Where in the current state-of-the-art SAN, Tunnel 24 has IPEX enabled, but SDN SAN switch 230a can create an SDN flow with instruction 3804 in FIG. 38. As part of a command package, instructions 3802 and 3804 are sent from SDN controller (e.g. as one of the endpoint devices 210) to SDN switch 10.10.10.111 (e.g. SDN SAN switch 230a). Lastly, the current state-of-the-art SAN requires a traffic control list (TCL) which allows the virtual tape device (e.g., Tape 1 as endpoint device 210) at 10.8.8.5 to communicate with the virtual tape device (e.g., Tape 2 as endpoint device 210) at 10.9.9.5. However, this is accomplished in SDN SAN switch 230a with instruction 3804 that also describes the route. According to one or more embodiments, the commands shown in FIG. 38 instruct the Brocade SAN switch at IP address 10.10.10.111 to have the same communication flow as a proprietary configuration, but these Ubuntu OpenFlow control commands are fewer and more concise than the proprietary configuration and use the same SDN commands as used for SDN LAN switches.

FIG. 39 illustrates OpenFlow commands to set up the network routes for FCIP/IPEX in which the commands are executed by an intervening router/switch in FIGS. 37A and 37B according to one or more embodiments. More particularly, FIG. 39 depicts the OpenFlow commands that will enable communication between the 2 virtual tape devices (e.g., Tape 1 and Tape 2 illustrated as different endpoint devices 210) using the intervening router/switch. It is noted these commands may be similar to those for LAN and SAN connections and use the analogous language and constructs. This is more concise than TCLs and fits into a "standard" routing system that is easier to understand and manage. Note that, if required, all the TCL specifications (e.g. port, source and destination, or subnet) can be described in the match table entry. As can be seen in FIGS. 37A, 37B, 38, and 39, SDN controller (e.g., endpoint device 210) is configured to create match table entries that are executed by the SAN switches 230 (e.g., Switches 1 and 2) and intervening router/switch, and the match table entries enable SDN executing on the SAN switches 230 and router/switch to perform TCL functions according to one or more embodiments.

FIG. 40 is a flowchart of a computer-implemented process 4000 for using an extension to match tables in software defined networking to manage storage area networks in accordance with one or more embodiments of the present invention. The computer-implemented process 4000 in FIG. 40 can be implemented using SAN 200 discussed herein, along with computer system 100 and/or elements of computer system 100 shown in FIG. 1. Accordingly, the computer-implemented process 4000 will now be described with reference to figures. At block 4002, a storage area network (SAN) switch 230 with and managed by a software defined networking (SDN) architecture is configured to receive at least one match table (e.g., depicted in memory 206), the at least one table comprising the SDN architecture and routing information. At block 4004, SAN switch 230 is configured to route traffic over a SAN 200 using the routing information in the at least one match table.

The at least one match table contains extended fields in the SDN architecture applicable for the SAN 200. The extended fields having been modified to a format for the SAN 200. The at least one table comprises match table entries having the routing information in the SDN architecture applicable for use in SAN 200. The controller (e.g., endpoint device 210) is configured to generate match table entries in the at least one table, the match table entries having the routing information in the SDN architecture and being applicable for the SAN 200. The SAN switch 230 is configured to receive the at least one table from the controller (e.g., endpoint device 210). The SAN switch 230 is configured to receive a frame (e.g., incoming traffic from a source endpoint device 210) having the SDN architecture, to match requested information in the frame to the routing information in the at least one table, and to use the at least one table to route the frame as the traffic over the SAN 200 (to a destination endpoint device 21). A controller (e.g., endpoint device 21) having the SDN architecture is configured to generate the at least one match table.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 41:
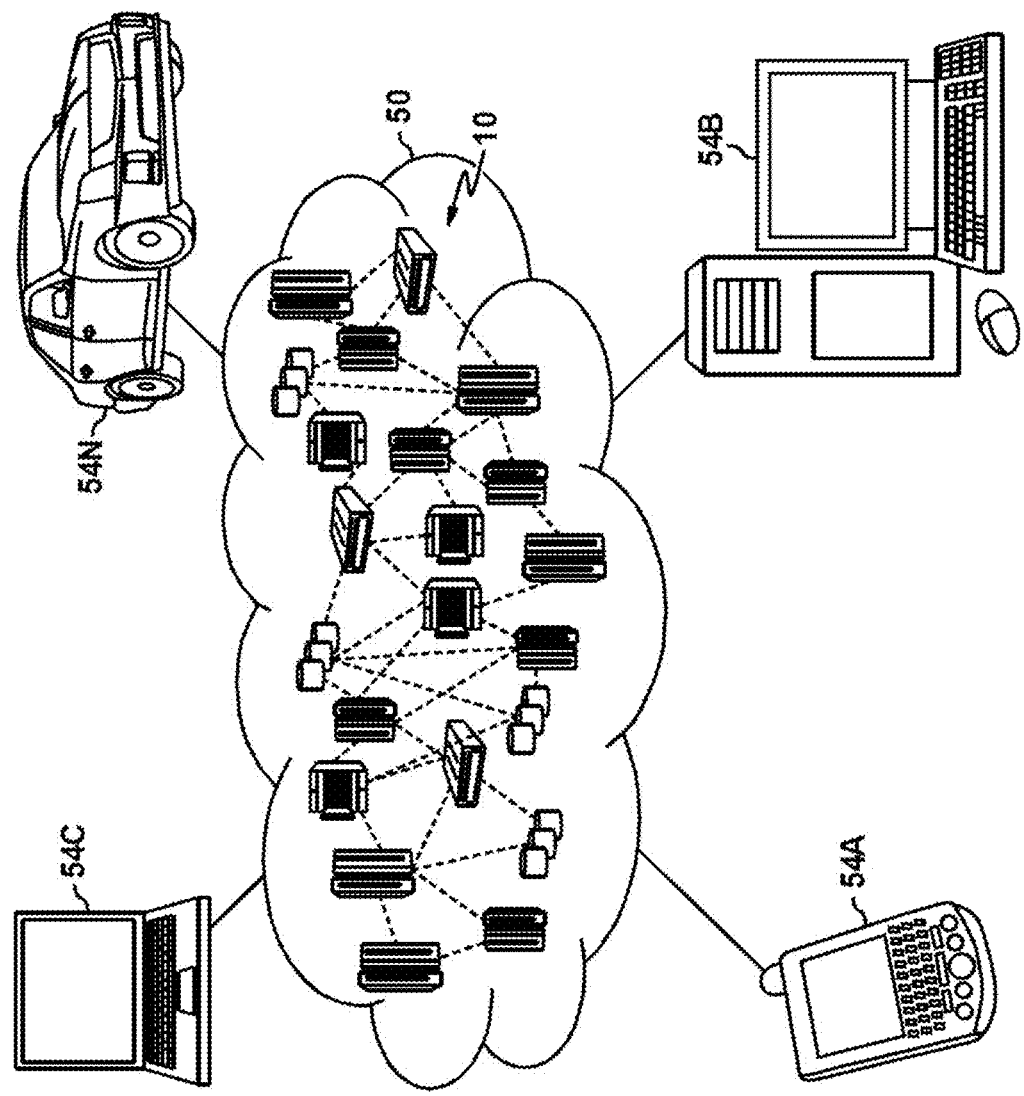
FIG. 41 depicts a cloud computing environment according to one or more embodiments of the present invention.

Referring now to FIG. 41, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 41 are intended to be illustrative only and that computing nodes 10 and cloud computing environment 50 can communicate with any type of computerized device over any type of network and/or network addressable connection (e.g., using a web browser).

Figure 42:
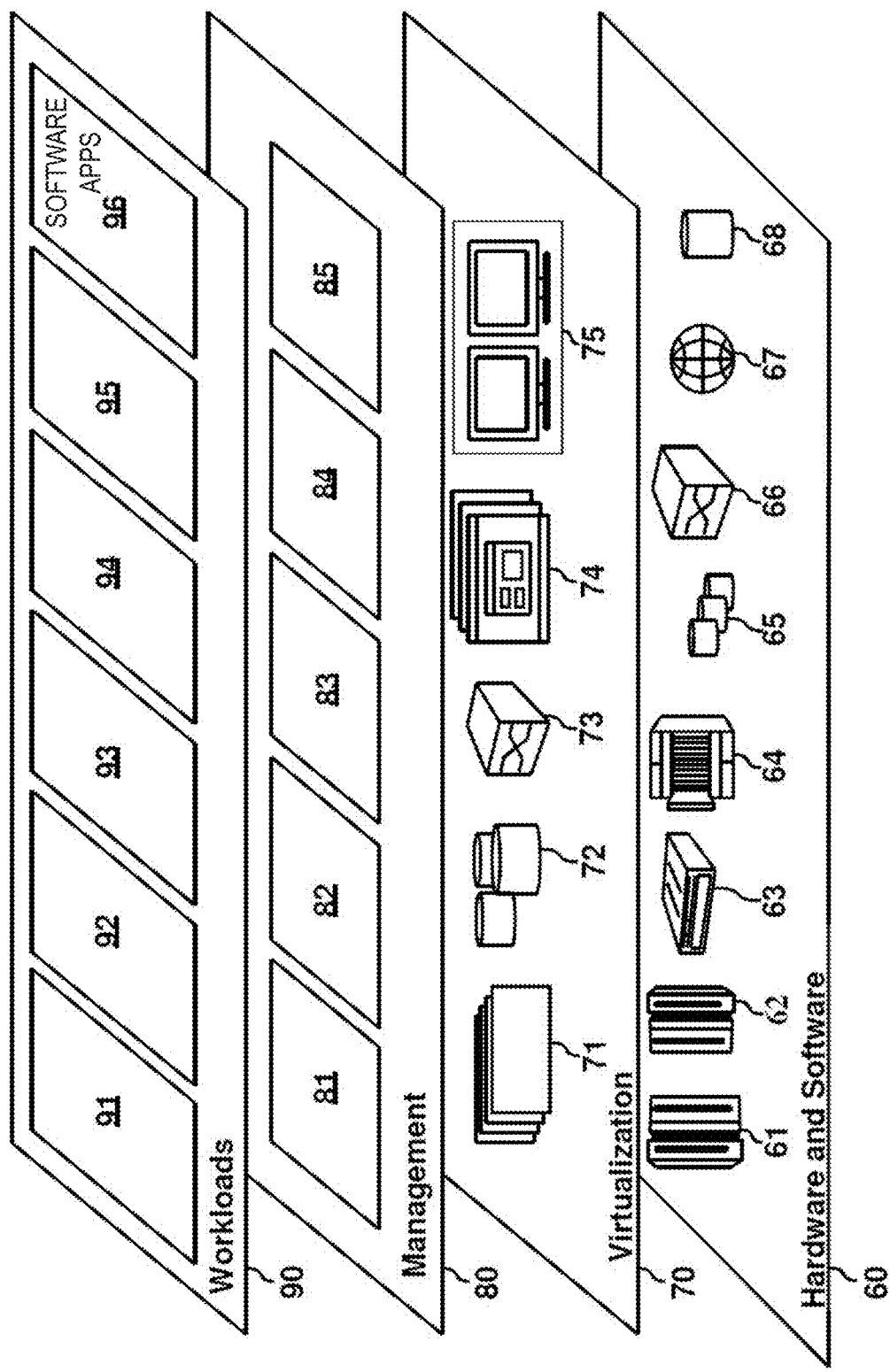
FIG. 42 depicts abstraction model layers according to one or more embodiments of the present invention.

Referring now to FIG. 42, a set of functional abstraction layers provided by cloud computing environment 50 (FIG. 41) is shown. It should be understood in advance that the components, layers, and functions shown in FIG. 42 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204 of SDN SAN switches 230, one or more software applications 220 in SDN controllers, etc.) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a switch configured with and managed by a software defined networking (SDN) architecture, at least one SDN table, the at least one SDN table being configured for use in the SDN architecture and comprising routing information, wherein the at least one SDN table comprises extended fields in the SDN architecture, the extended fields having a type entry, a length entry, and a value entry, wherein the extended fields in the at least one SDN table of the SDN architecture have been modified to integrate a storage area network (SAN) source and a SAN destination in the SAN, and wherein the modified extended fields include the routing information comprising the SAN source and the SAN destination; and
    routing, by the switch, traffic over the SAN using the SAN source and the SAN destination in the routing information in the at least one SDN table.

2. The computer-implemented method of claim 1, wherein the extended fields in the at least one SDN table comprise identification of one or more SAN ports in the SAN.

3. The computer-implemented method of claim 1, wherein the switch is configured to route the traffic for both the SAN and a SDN.

4. The computer-implemented method of claim 1, wherein the at least one SDN table further comprises match table entries having the routing information in the SDN architecture applicable for the SAN.

5. The computer-implemented method of claim 1, wherein a controller is configured to generate match table entries in the at least one SDN table, the match table entries having the routing information in the SDN architecture applicable for the SAN.

6. The computer-implemented method of claim 1, wherein the switch is configured to receive the at least one SDN table from a controller.

7. The computer-implemented method of claim 1, wherein the switch is configured to receive a frame configured for use in the SDN architecture, to match requested information in the frame to the routing information in the at least one SDN table, and to use the at least one SDN table to route the frame as the traffic over the SAN.

8. A system comprising:
    a memory having computer readable instructions; and
    one or more processors of a switch for executing the computer readable instructions, the computer readable instructions controlling the one or more processors to perform operations comprising:
        receiving, by the switch, at least one software defined networking (SDN) table, the at least one SDN table being configured for use in a SDN architecture and comprising routing information, the switch configured with and managed by the SDN architecture, wherein the at least one SDN table comprises extended fields in the SDN architecture, the extended fields having a type entry, a length entry, and a value entry, wherein the extended fields in the at least one SDN table of the SDN architecture have been modified to integrate a storage area network (SAN) source and a SAN destination in the SAN, and wherein the modified extended fields include the routing information comprising the SAN source and the SAN destination; and
        routing, by the switch, traffic over the SAN using the SAN source and the SAN destination in the routing information in the at least one SDN table.

9. The system of claim 8, wherein the switch is configured to route the traffic for both the SAN and a SDN.

10. The system of claim 8, wherein the at least one SDN table comprises the extended fields in the SDN architecture applicable for the SAN, the extended fields having been modified to a format for the SAN.

11. The system of claim 8, wherein the at least one SDN table further comprises match table entries having the routing information in the SDN architecture applicable for the SAN.

12. The system of claim 8, wherein a controller is configured to generate match table entries in the at least one SDN table, the match table entries having the routing information in the SDN architecture applicable for the SAN.

13. The system of claim 8, wherein the switch is configured to receive the at least one SDN table from a controller.

14. The system of claim 8, wherein the switch is configured to receive a frame configured for use in the SDN architecture, to match requested information in the frame to the routing information in the at least one SDN table, and to use the at least one SDN table to route the frame as the traffic over the SAN.

15. A computer program product comprising a computer readable storage medium having program instructions embodied therewith, the program instructions executable by a processor of a switch to cause the processor to perform operations comprising:
   receiving, by the switch, at least one software defined networking (SDN) table, the at least one SDN table being configured for use in a SDN architecture and comprising routing information, the switch configured with and managed by the SDN architecture, wherein the at least one SDN table comprises extended fields in the SDN architecture, the extended fields having a type entry, a length entry, and a value entry, wherein the extended fields in the at least one SDN table of the SDN architecture have been modified to integrate a storage area network (SAN) source and a SAN destination in the SAN, and wherein the modified extended fields include the routing information comprising the SAN source and the SAN destination; and
   routing, by the switch, traffic over the SAN using the SAN source and the SAN destination in the routing information in the at least one SDN table.

16. The computer program product of claim 15, wherein the switch is configured to route the traffic for both the SAN and a SDN.

17. The computer program product of claim 15, wherein the at least one SDN table comprises the extended fields in the SDN architecture applicable for the SAN, the extended fields having been modified to a format for the SAN.

18. The computer program product of claim 15, wherein the at least one SDN table further comprises match table entries having the routing information in the SDN architecture applicable for the SAN.

19. The computer program product of claim 15, wherein a controller is configured to generate match table entries in the at least one SDN table, the match table entries having the routing information in the SDN architecture applicable for the SAN.

20. The computer program product of claim 15, wherein the switch is configured to receive the at least one SDN table from a controller.

* * * * *